United States Patent
Fukunishi

(10) Patent No.: US 8,379,932 B2
(45) Date of Patent: Feb. 19, 2013

(54) IMAGE PROCESSING APPARATUS, RECORDING MEDIUM STORING IMAGE PROCESSING PROGRAM, AND ELECTRONIC APPARATUS

(75) Inventor: Munenori Fukunishi, Kunitachi (JP)

(73) Assignee: Olympus Corporation, Tokyo (JP)

( * ) Notice: Subject to any disclaimer, the term of this patent is extended or adjusted under 35 U.S.C. 154(b) by 819 days.

(21) Appl. No.: 12/534,295

(22) Filed: Aug. 3, 2009

(65) Prior Publication Data

US 2010/0034428 A1    Feb. 11, 2010

(30) Foreign Application Priority Data

Aug. 5, 2008    (JP) .................................. 2008-202207

(51) Int. Cl.
*G06K 9/00*    (2006.01)
(52) U.S. Cl. ....................................................... 382/107
(58) Field of Classification Search .................. 382/100, 382/107

See application file for complete search history.

(56) References Cited

U.S. PATENT DOCUMENTS

| | | | |
|---|---|---|---|
| 7,379,565 B2 * | 5/2008 | Blonde et al. .................. | 382/107 |
| 7,379,566 B2 * | 5/2008 | Hildreth ......................... | 382/107 |
| 7,502,052 B2 | 3/2009 | Kamoshida | |
| 7,593,037 B2 * | 9/2009 | Matsumoto et al. ...... | 348/208.13 |
| 7,720,296 B2 * | 5/2010 | Hahn et al. .................... | 382/236 |
| 7,848,542 B2 * | 12/2010 | Hildreth ......................... | 382/107 |
| 8,009,872 B2 * | 8/2011 | Kurata ............................ | 382/107 |
| 8,098,912 B2 * | 1/2012 | Pedrizzetti et al. ........... | 382/128 |
| 2007/0002145 A1 | 1/2007 | Furukawa | |
| 2009/0244299 A1 * | 10/2009 | Fukunishi .................. | 348/208.4 |

FOREIGN PATENT DOCUMENTS

| | | |
|---|---|---|
| JP | 8-163573 A | 6/1996 |
| JP | 8-251474 A | 9/1996 |
| JP | 3164121 B2 | 3/2001 |
| JP | 2005-269419 A | 9/2005 |
| JP | 2007-013430 A | 1/2007 |

OTHER PUBLICATIONS

Japanese Office Action dated May 22, 2012 in counterpart Japanese Application No. 2008-202207.

* cited by examiner

*Primary Examiner* — Brian P Werner
*Assistant Examiner* — Shefali Goradia
(74) *Attorney, Agent, or Firm* — Holtz, Holtz, Goodman & Chick, PC

(57) ABSTRACT

A motion vector measurement condition setting unit determines a measurement precision, which is used when measuring a motion vector between a plurality of images, on the basis of information indicating a distortion in an optical system and sets a plurality of motion vector measurement regions in which the motion vector is to be measured on an image. A motion vector calculation unit determines the motion vector between the plurality of images in each of the plurality of motion vector measurement regions at the determined measurement precision. A motion vector integration processing unit determines a positional displacement amount between the plurality of images on the basis of the motion vector determined in each of the plurality of motion vector measurement regions.

21 Claims, 17 Drawing Sheets

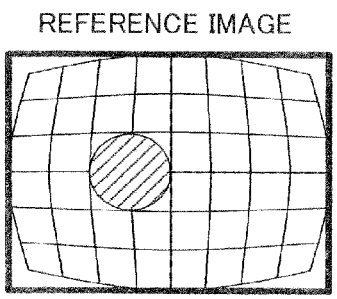
FIG.17A REFERENCE IMAGE
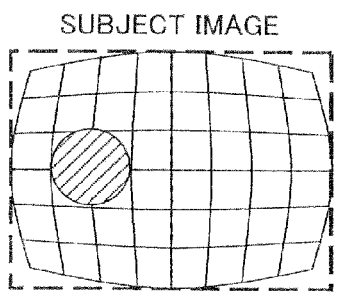
FIG.17B SUBJECT IMAGE
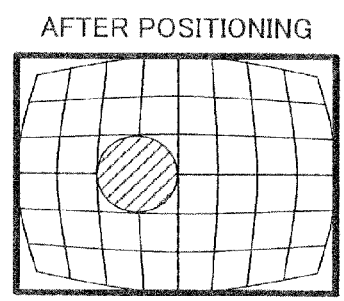
FIG.17C AFTER POSITIONING
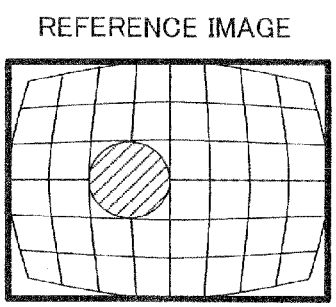
FIG.17D REFERENCE IMAGE
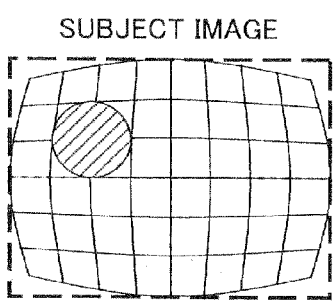
FIG.17E SUBJECT IMAGE
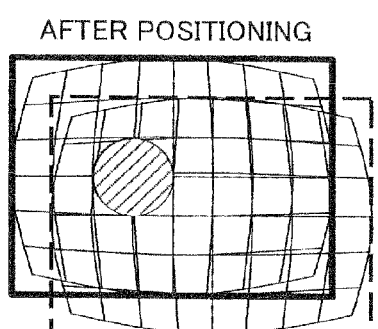
FIG.17F AFTER POSITIONING

IMAGE PROCESSING APPARATUS, RECORDING MEDIUM STORING IMAGE PROCESSING PROGRAM, AND ELECTRONIC APPARATUS

FIELD OF THE INVENTION

This invention relates to a technique for positioning a plurality of images, including a technique for superimposing images and a technique for correcting image blur.

BACKGROUND OF THE INVENTION it is known that in an electronic image pickup apparatus such as a digital camera, image blur due to hand movement or object movement is more likely to occur when a shutter speed is low. Mechanical hand movement correction and electronic hand movement correction may be employed as methods of suppressing image blur due to hand movement.

Mechanical hand movement correction may be performed using a lens shift method, a sensor shift method, and so on. In the lens shift method, image blur correction is performed by measuring a displacement amount using a gyro sensor or the like and driving a correction optical system for offsetting an imaging optical axis. In the sensor shift method, image blur correction is performed by moving an imaging device on the basis of a displacement amount measured using a similar gyro sensor or the like.

Meanwhile, in electronic hand movement correction, a plurality of images are captured at high speed and chronologically, and a positional displacement amount between the images is measured using a sensor or an image processing method. The positional displacement amount is then corrected, whereupon the plurality of images are added together to generate a non-blurry image.

A block matching method is known as a typical technique for determining the positional displacement amount between the images. In the block matching method, a block of an appropriate size (for example, 8 pixels×8 lines) is defined within a reference image, and a match index value is calculated within a fixed range from a corresponding location of a comparison image. The positional displacement amount between the images is then calculated by determining a position in which the calculated match index value is largest (or smallest depending on the index value).

The match index value may be a sum of squared intensity difference (SSD), which is a sum of squares of a pixel value difference, a sum of absolute intensity difference (SAD), which is a sum of absolute values of the pixel value difference, and so on. As SSD or SAD decreases, the match is determined to be closer. When pixel values of pixel positions p∈I and q∈I' are set respectively as Lp, Lq in a reference block region I and a subject block region I' of a matching operation, SSD and SAD are respectively expressed by the following Equations (1) and (2). It should be noted that p, q are quantities having two-dimensional values, I and I' represent two-dimensional regions, and p∈I indicates that a coordinate p is included in the region I.

$$SSD(I, I') = \sum_{p \in I, q \in I'} (Lp - Lq)^2 \quad (1)$$

$$SAD(I, I') = \sum_{p \in I, q \in I'} \|Lp - Lq\| \quad (2)$$

A method employing a normalized cross-correlation (NCC) also exists. In a zero average correlation, average values Ave (Lp), Ave (Lq) of the pixels p∈I and q∈I' included respectively in the reference block region I and the subject block region I' of the matching operation are calculated. A difference between the pixel values included in the respective blocks is then calculated using the following Equations (3), (4).

$$Lp' = \left. \frac{Lp - Ave(Lp)}{\sqrt{\frac{1}{n}\sum_{p \in I}(Lp - Ave(Lp))^2}} \right|_{p \in I} \quad (3)$$

$$Lq' = \left. \frac{Lq - Ave(Lq)}{\sqrt{\frac{1}{n}\sum_{q \in I'}(Lq - Ave(Lq))^2}} \right|_{q \in I'} \quad (4)$$

Next, a normalization cross-correlation NCC is calculated using Equation (5).

$$NCC = \Sigma Lp'Lq' \quad (5)$$

Blocks having a large normalization cross-correlation NCC are determined to be a close match (have a high correlation), and the relative displacement amount between the blocks I' and I exhibiting the closest match is determined.

For example, in a case where movement of a hand of a photographer is corrected using electronic blur correction, it is important to determine the movement of the entire image with stability when determining the inter-image positional displacement amount using the method described above.

When an object included in a photographed image is stationary, movement within individual regions matches the movement of the entire image. Therefore, in the matching processing described above, a motion vector calculation result from a suitable region for determining the image displacement amount may be regarded as the movement of the entire image. Normally, a motion vector is determined in each of a plurality of regions of the image, whereupon a highly reliable motion vector, which is obtained by excluding the motion vectors of regions that are unsuitable for determining a motion vector, such as noisy regions, low contrast regions, and repeated pattern regions, is selected as the movement of the entire image.

On the other hand, when the object included in the photographed image includes movement, the overall movement of the image must be distinguished from the movement of the object before the motion vector of the entire image is selected. In JP8-251474A, for example, an object is divided into a plurality of regions, a region suitable for determining a motion vector is selected using the sizes of the motion vectors of the respective regions, the sizes of the regions themselves, and so on as a reference, and the motion vector of the selected region is set as the overall movement.

Here, distortion normally exists in an optical system. In particular, when photography is performed using a lens having a large distortion such as a wide angle lens, the distortion is small in a central portion of the image, and therefore an image having large distortion on the image end portions is obtained (see FIGS. 16A and 16B). When the inter-image positional displacement amount is determined using an image having this type of distortion, unevenness in the motion vector occurs in accordance with a distance from the center of the image (to be referred to hereafter as the image height). As shown in FIG. 16A, in an image photographed using an optical system having negative distortion, the motion vector of a region having a great image height is smaller than the motion vector of a region having a small image height. Conversely, as shown in FIG. 16B, in an image photographed using an optical system having positive distortion, the motion vector of a region having a great image height is greater than the motion vector of a region having a small image height.

SUMMARY OF THE INVENTION

An image processing device of an aspect of the present invention for performing positioning processing between a plurality of images using a positional displacement amount between the plurality of images comprises a measurement precision determination unit that determines a measurement precision, which is used when measuring a motion vector between the plurality of images, on the basis of information indicating a distortion in an optical system, a motion vector measurement region setting unit that sets a plurality of motion vector measurement regions in which the motion vector is to be measured on an image, a motion vector calculation unit that determines the motion vector between the plurality of images in each of the plurality of motion vector measurement regions at the determined measurement precision, and a positional displacement amount calculation unit that determines the positional displacement amount between the plurality of images on the basis of the motion vector determined in each of the plurality of motion vector measurement regions.

A recording medium of another aspect of the present invention stores an image processing program for causing a computer to execute a step of determining a measurement precision, which is used when measuring a motion vector between the plurality of images, on the basis of information indicating a distortion in an optical system, a step of setting a plurality of motion vector measurement regions in which the motion vector is to be measured on an image, a step of determining the motion vector between the plurality of images in each of the plurality of motion vector measurement regions at the determined measurement precision, and a step of determining the positional displacement amount between the plurality of images on the basis of the motion vector determined in each of the plurality of motion vector measurement regions.

An image processing device of yet another aspect of the present invention for performing positioning processing between a plurality of images using a positional displacement amount between the plurality of images comprises a motion vector measurement condition setting unit that determines a size of a motion vector measurement region for measuring a motion vector between the plurality of images in each position in which the motion vector is to be measured on the basis of information indicating a distortion in an optical system, a motion vector measurement region setting unit that sets a plurality of the motion vector measurement regions on an image on the basis of the determined size, a motion vector calculation unit that determines the motion vector between the plurality of images in each of the plurality of motion vector measurement regions, and a positional displacement amount calculation unit that determines the positional displacement amount between the plurality of images on the basis of the motion vector determined in each of the plurality of motion vector measurement regions.

A recording medium of yet another aspect of the present invention stores an image processing program for causing a computer to execute a step of determining a size of a motion vector measurement region for measuring a motion vector between the plurality of images in each position in which the motion vector is to be measured on the basis of information indicating a distortion in an optical system, a step of setting a plurality of the motion vector measurement regions on an image on the basis of the determined size, a step of determining the motion vector between the plurality of images in each of the plurality of motion vector measurement regions, and a step of determining the positional displacement amount between the plurality of images on the basis of the motion vector determined in each of the plurality of motion vector measurement regions.

An image processing device of yet another aspect of the present invention for performing positioning processing between a plurality of images using a positional displacement amount between the plurality of images comprises a motion vector measurement region setting unit that sets a plurality of motion vector measurement regions in which a motion vector between the plurality of images is to be measured on an image, a motion vector calculation unit that determines the motion vector between the plurality of images in each of the plurality of motion vector measurement regions, a motion vector correction unit that corrects a size of the motion vector determined in each of the plurality of motion vector measurement regions on the basis of information indicating a distortion in an optical system, and a positional displacement amount calculation unit that determines the positional displacement amount between the plurality of images on the basis of the plurality of corrected motion vectors.

A recording medium of yet another aspect of the present invention stores an image processing program for causing a computer to execute a step of setting a plurality of motion vector measurement regions in which a motion vector between the plurality of images is to be measured on an image, a step of determining the motion vector between the plurality of images in each of the plurality of motion vector measurement regions, a step of correcting a size of the motion vector determined in each of the plurality of motion vector measurement regions on the basis of information indicating a distortion in an optical system, and a step of determining the positional displacement amount between the plurality of images on the basis of the plurality of corrected motion vectors.

BRIEF DESCRIPTION OF THE DRAWINGS

FIGS. 17A, 17B and 17C are views respectively showing a reference image, a subject image, and a positioned image in a case where the positional displacement amount is small. FIGS. 17D, 17E and 17F are views respectively showing a reference image, a subject image, and a positioned image in a case where the positional displacement amount is large.

DESCRIPTION OF THE PREFERRED EMBODIMENTS

First Embodiment

Figure 1:
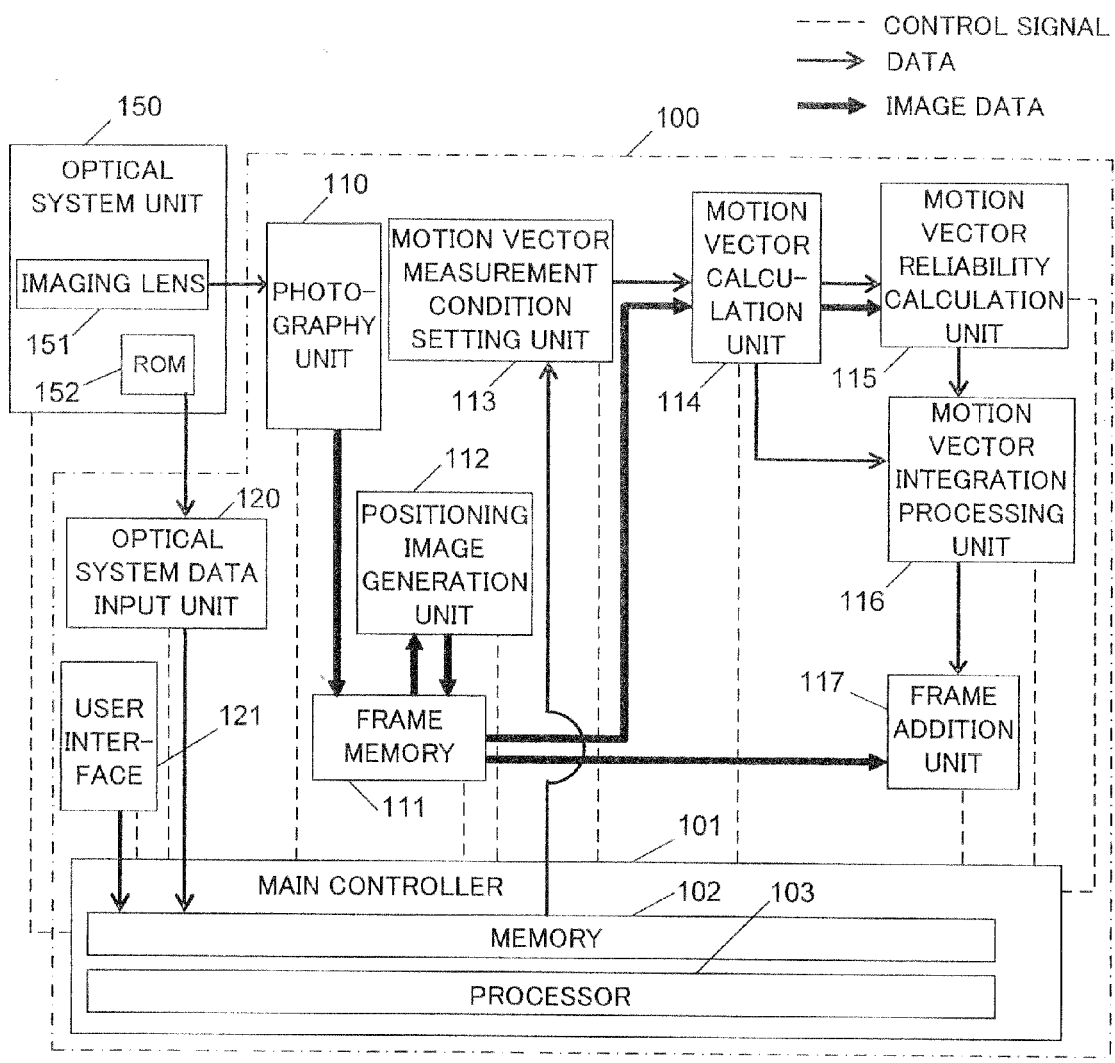
FIG. 1 is a block diagram showing the constitution of an image processing device according to a first embodiment.

FIG. 1 is a block diagram showing the constitution of an image processing device 100 according to a first embodiment. In the figure, dotted lines denote control signals, thin lines denote the flow of data such as motion vectors and reliability values, and thick lines denote the flow of image data. The image processing device 100 according to this embodiment is installed in an electronic apparatus. The electronic apparatus is a device that depends on an electric current or an electromagnetic field in order to work correctly, including a digital camera, a digital video camera, an endoscope, and so on.

A main controller 101 includes a processor 103 that performs operation control of the entire device, and a memory 102 that stores imaging parameters and various types of processing information and performs command generation and status management in relation to respective processing blocks.

An optical system unit 150 includes an imaging lens 151 and a ROM 152. The ROM 152 stores optical system data such as information indicating the distortion of the optical system. The optical system data are input into the image processing device 100 via an optical system data input unit 120 and stored in the memory 102. The memory 102 stores imaging parameters such as a shutter speed, an aperture, a focal distance, a continuous shooting speed, and an ISO sensitivity, which are input from a user interface 121.

A photography unit 110 is constituted by an imaging device such as a CCD or a CMOS, for example, which forms an image on the basis of light passing through the imaging lens 151. The formed image is stored in a frame memory 111. In this embodiment, in which electronic blur correction processing is performed, a plurality of images are stored in the frame memory 111 continuously and chronologically. The images stored in the frame memory 111 include an image serving as a positioning reference (to be referred to hereafter as a reference image) and an image to be positioned relative to the reference image (to be referred to hereafter as a subject image). A single image may be selected from the plurality of images as the reference image either arbitrarily or using a predetermined method.

A positioning image generation unit 112 generates positioning images by converting the reference image and the subject image into images suitable for positioning respectively. A method of generating the positioning images will be described below.

A motion vector measurement condition setting unit 113 sets a plurality of motion vector measurement regions for measuring a motion vector and a motion vector calculation precision on the basis of the optical system data stored in the memory 102, image information, and measurement region parameters. The image information includes information such as the width and height of the positioning images. The measurement region parameters include the number of motion vector measurement regions in the X and Y directions, a search range, and so on A method of setting the motion vector measurement region and the motion vector calculation precision will be described in detail below. Hereafter, the "motion vector measurement region" will also be referred to simply as a "measurement region".

A motion vector calculation unit 114 uses the positioning images stored in the frame memory 111, the motion vector measurement region, and the motion vector calculation precision to calculate a motion vector representing mapping from the subject image to the reference image in each measurement region. A method of calculating the motion vector will be described in detail below.

A motion vector reliability calculation unit 115 calculates a reliability, which represents the reliability (probability) of each motion vector, on the basis of the motion vector of each measurement region and the positioning images. A method of calculating the reliability will be described in detail below.

A motion vector integration processing unit 116 determines a positional displacement amount between the reference image and the subject image on the basis of the motion vector of each measurement region and the reliability of each motion vector. A method of determining the inter-image positional displacement amount will be described in detail below.

A frame addition unit 117 performs frame addition processing on the basis of the reference image and subject image stored in the frame memory 111 and the positional displacement amount determined by the motion vector integration processing unit 116. More specifically, the frame addition unit 117 shifts the subject image by an amount corresponding to the positional displacement amount, and adds the shifted subject image to the reference image.

Figure 2:
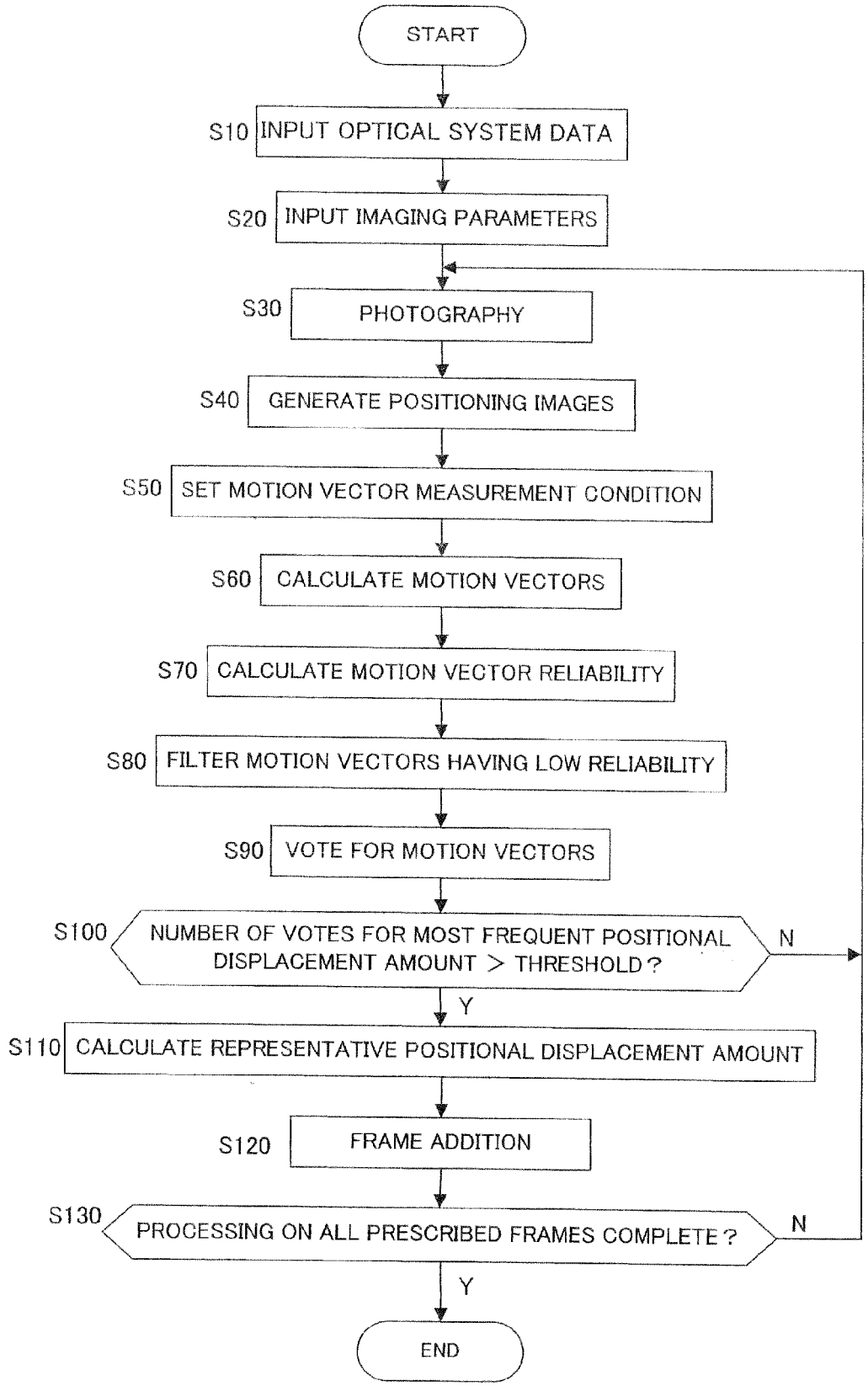
FIG. 2 is a flowchart showing a processing procedure of processing performed by the image processing device according to the first embodiment.

FIG. 2 is a flowchart showing a processing procedure of processing performed by the image processing device according to the first embodiment. In a step S10, the optical system data input unit 120 obtains optical system data, such as information indicating distortion in the optical system, from the ROM 152 and stores the obtained information in the memory 102 of the main controller 101.

In a step S20, the user interface 121 obtains imaging parameters including the shutter speed, aperture, focal distance, continuous shooting speed, and ISO sensitivity, and stores the obtained parameters in the memory 102. In a step S30, the photography unit 110 performs photography on the basis of the imaging parameters input into the memory 102. A plurality of photographed images are then stored in the frame memory 111.

In a step S40, the positioning image generation unit 112 generates a positioning reference image and a positioning subject image, i.e. the positioning images, on the basis of the reference image and subject image stored in the frame memory 111. The positioning reference image and the positioning subject image are obtained by reducing the reference image and the subject image, respectively. The generated positioning reference image and positioning subject image are stored in the frame memory 111.

In a step S50, the motion vector measurement condition setting unit 113 calculates and sets motion vector measurement regions and a motion vector calculation precision on the basis of the optical system data stored in the memory 102, image information such as the width and height of the positioning images, and measurement region parameters. As noted above, the measurement region parameters include the number of measurement regions in the X and Y directions, the search range, and so on. The processing of the step S50 will now be described in detail using a flowchart shown in FIG. 3.

Figure 3:
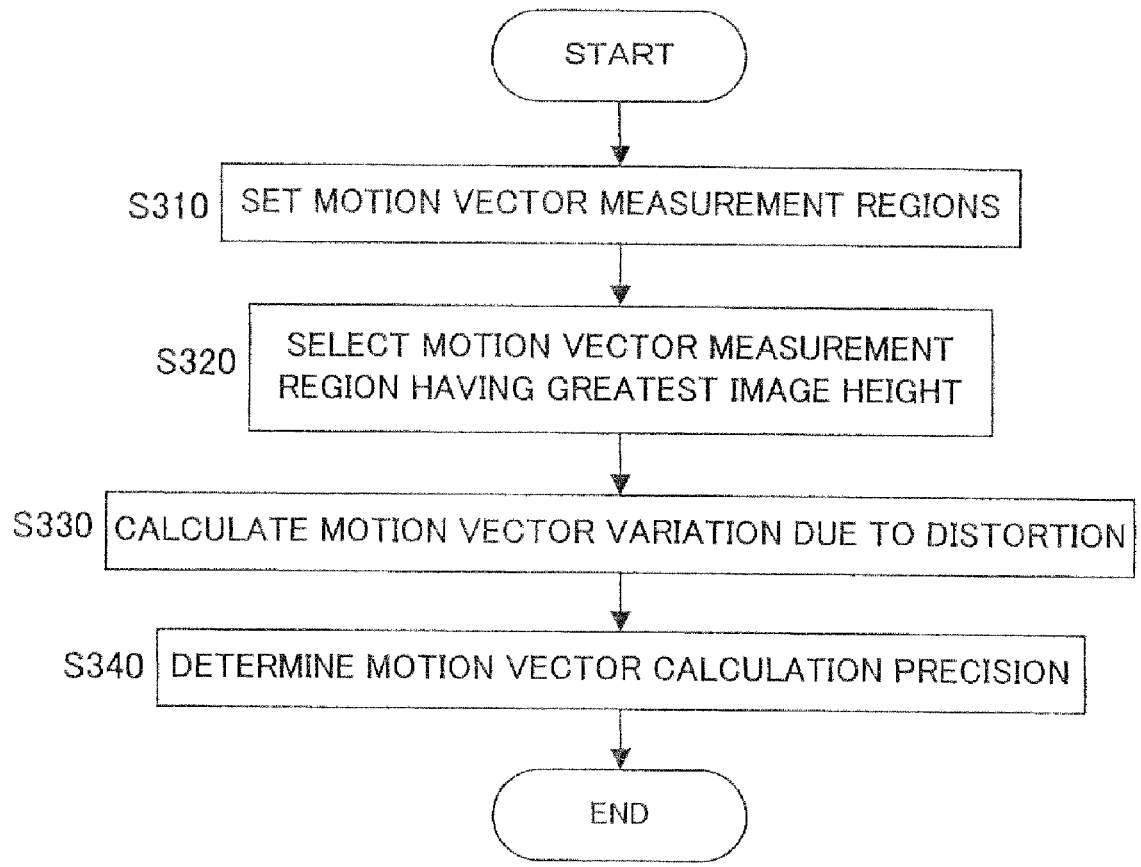
FIG. 3 is a flowchart showing the detail of the processing executed by a motion vector measurement condition setting unit.

In the processing of the flowchart shown in FIG. 3, the motion vector measurement regions are set and the motion vector measurement precision is determined such that variation due to distortion does not occur in the motion vector during motion vector measurement.

In a step S310, motion vector measurement regions are set in a grid pattern on the basis of the image information including the width, height, and so on of the positioning images, and the measurement region parameters.

Figure 4A:
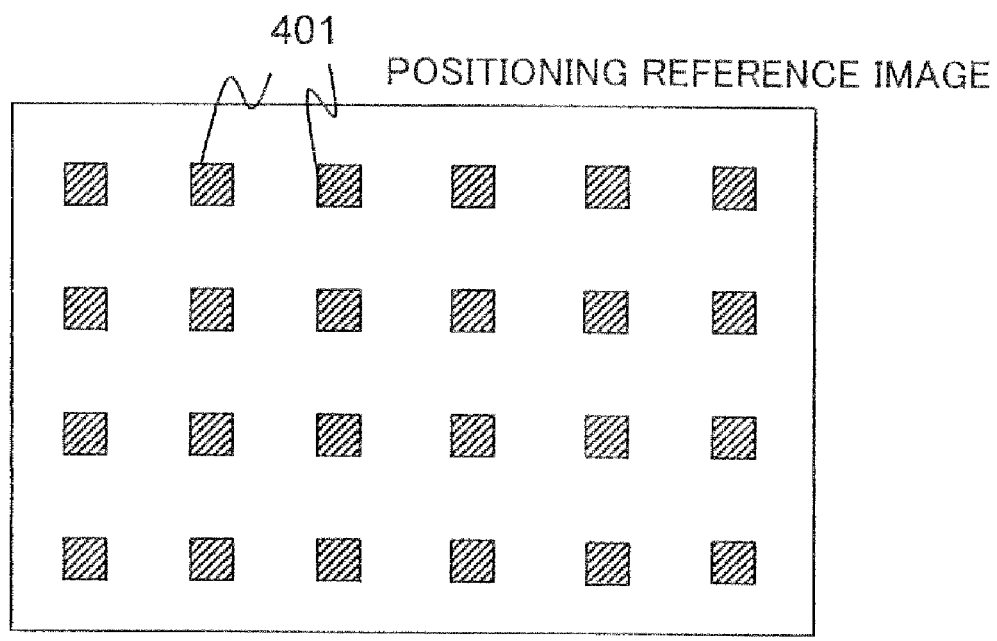
FIG. 4A is a view showing a template region set on a positioning reference image.

FIG. 4A is a view showing a template region 401 serving as a positioning reference region set on the positioning reference image. As shown in FIG. 4A, the template region 401 is a rectangular region of a predetermined size, which is used in motion vector measurement (motion vector detection).

Figure 4B:
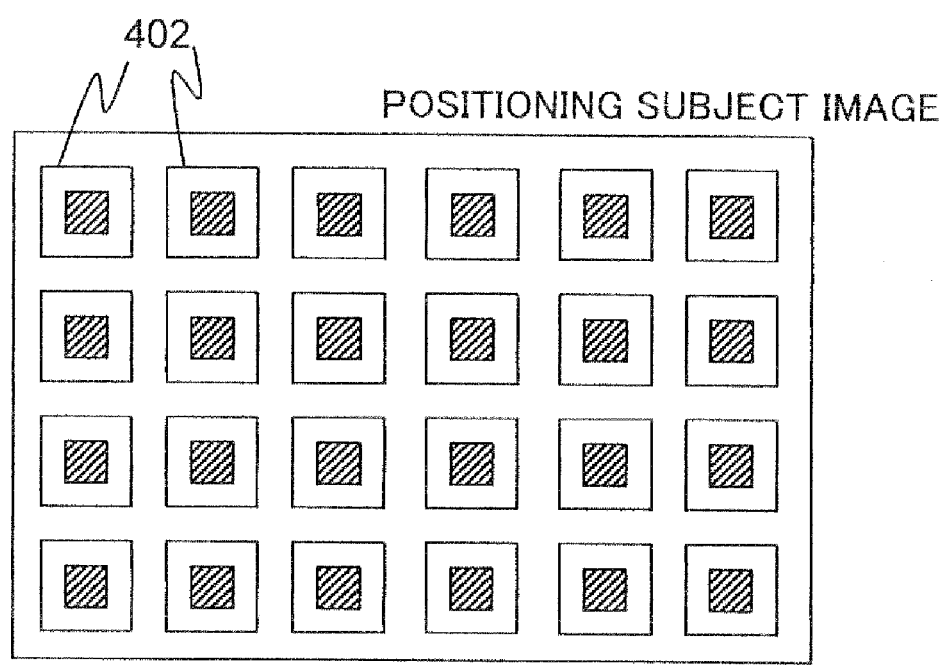
FIG. 4B is a view showing a motion vector measurement region set on a positioning subject image.

FIG. 4B is a view showing a motion vector measurement region 402 set on the positioning subject image. The measurement region 402 is set on the positioning subject image in the vicinity of coordinates of the corresponding template region 401 in a wider range than the template region.

In the motion vector calculation to be described below, a region having a high correlation to the template region 401 set on the positioning reference image is determined by moving the template region within the corresponding measurement region 402 of the positioning subject image.

It should be noted that the template region 401 may be set on the positioning subject image and the measurement region 402 may be set on the positioning reference image in the vicinity of the coordinates of the corresponding template region 401.

Figure 5:
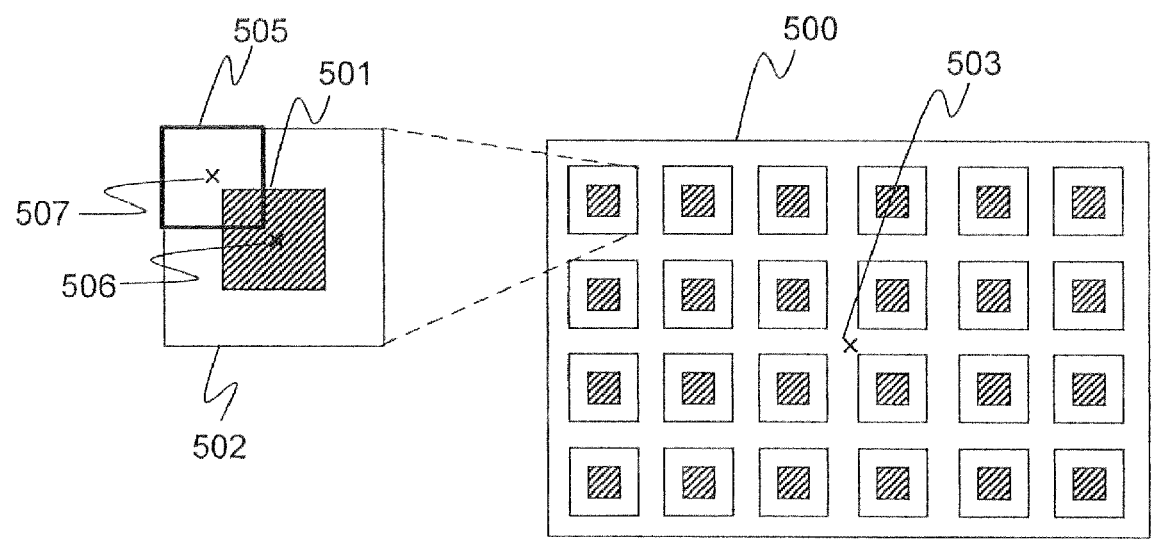
FIG. 5 is a view showing a measurement region set in the upper left corner, from among the motion vector measurement regions having the greatest image height in the positioning subject image.

In a step S320, motion vector measurement regions having the greatest image height are selected from the plurality of motion vector measurement regions 402 set in the step S310. The motion vector measurement regions having the greatest image height correspond to the measurement regions set in the four corners of the positioning subject image. FIG. 5 is a view showing a measurement region 502 set in the upper left corner, from among the motion vector measurement regions having the greatest image height in a positioning subject image 500. Hereafter, the measurement region 502 will be described as a representative example of the motion vector measurement regions having the greatest image height.

In a step S330, a maximum variation of an amount of motion vector variation caused by the distortion is determined in the motion vector measurement region 502 having the greatest image height. A method of calculating a distortion amount and a motion vector variation amount due to the distortion will now be described.

A relationship shown in a following Equation (6) is established between an ideal image height excluding the effects of the distortion (to be referred to hereafter as an ideal image height Y) and the actual image height of the image (to be referred to hereafter as an actual image height Y'), using a distortion coefficient DT, which serves as data representing the distortion in the optical system.

$$DT = \frac{Y' - Y}{Y} \times 100 \tag{6}$$

By modifying Equation (6), an Equation (7) expressing the actual image height Y' is obtained.

$$Y' = Y\left(1 + \frac{DT}{100}\right) \tag{7}$$

Figure 6:
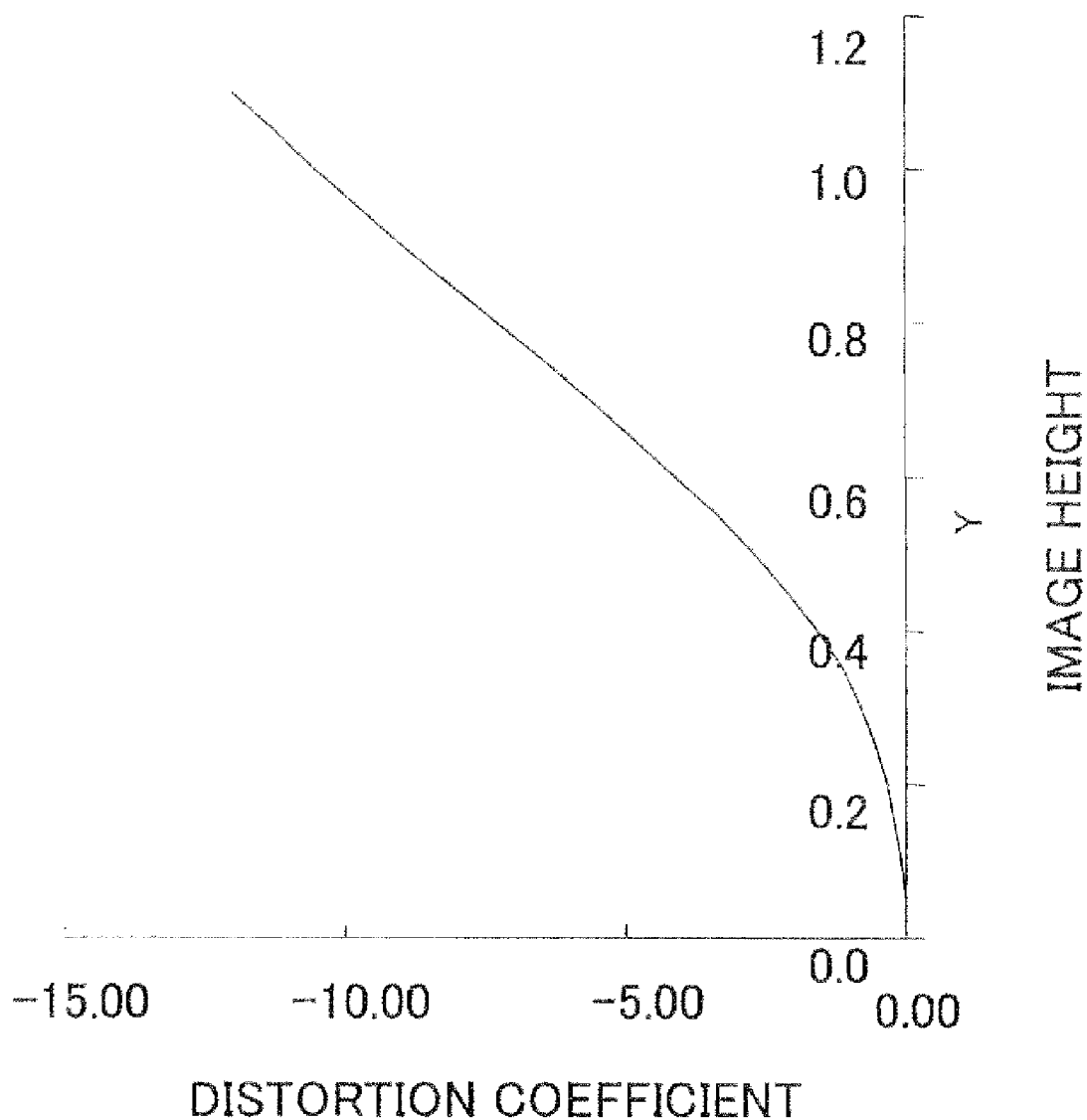
FIG. 6 is a view showing an example of a relationship between an ideal image height Y and a distortion coefficient DT determined through experiment.

The distortion coefficient DT may be determined through experiment by photographing an object having a known shape, determining the ideal image height Y and actual image height Y' thereof, and inserting the determined ideal image height Y and actual image height Y' into Equation (6). FIG. 6 is a view showing an example of a relationship between the ideal image height Y and the distortion coefficient DT determined through experiment. The distortion coefficient DT may be approximated by a polynomial such as that shown in a following Equation (8).

$$DT = aZ^3 + bZ^2 + cZ, Z \equiv Y^2 \tag{8}$$

By determining coefficients a, b, c of the polynomial shown in Equation (8), the distortion coefficient DT relating to an arbitrary ideal image height Y can be determined. Assuming that the ideal image height Y and the distortion coefficient DT corresponding to the ideal image height Y form a single group, the coefficients a, b, c can be determined from the relationships between at least three groups of ideal image heights Y and distortion coefficients DT. It should be noted that here, the distortion coefficient DT is approximated by a third order polynomial, but may be approximated by a higher order polynomial.

When the distortion coefficient DT expressed by Equation (8) is inserted into Equation (7), a following Equation (9) is obtained as a conversion equation for converting the ideal image height Y into the actual image height Y'.

$$Y' = Y\left(\frac{a}{100}Y^6 + \frac{b}{100}Y^4 + \frac{c}{100}Y^2 + 1\right) \tag{9}$$

Next, a method of calculating the motion vector variation amount due to the distortion will be described. A motion vector between two arbitrary points, i.e. a point A $(x_1, y_1)$ and a point B $(x_2, y_2)$, on an image photographed under ideal conditions in which no distortion exists is expressed by a following Equation (10).

$$\vec{AB} = (x_2 - x_1, y_2 - y_1) \tag{10}$$

On an image photographed using an optical system in which distortion exists, on the other hand, a motion vector between two points A'-B' corresponding to the points A-B is expressed by a following Equation (11).

$$\overrightarrow{A'B'} = (\alpha_2 x_2 - \alpha_1 x_1, \alpha_2 y_2 - \alpha_1 y_1)) \quad (11)$$

Here, $\alpha_1$, $\alpha_2$ in Equation (11) are expressed by a following Equation (12).

$$\alpha_1 = \left(1 + \frac{DT_1}{100}\right), \alpha_2 = \left(1 + \frac{DT_2}{100}\right) \quad (12)$$

$DT_1$, $DT_2$: distoration coefficient

Therefore, variation in the motion vector, i.e. the difference between the motion vector under ideal conditions in which no distortion exists and the motion vector under conditions in which distortion exists, is expressed by a following Equation (13).

$$\overrightarrow{\Delta A'B'} = \overrightarrow{A'B'} - \overrightarrow{AB} = ((\alpha_2 - 1)x_2 - (\alpha_1 - 1)x_1, (\alpha_2 - 1)y_2 - (\alpha_1 - 1)y_1) \quad (13)$$

Here, variation in the motion vector of the motion vector measurement region 502 due to the distortion reaches a maximum when the motion vector is at a maximum. In other words, the motion vector variation reaches a maximum when the motion vector moves from the template region 501 shown in FIG. 5 to a maximum image height position 505 to which the template region 501 can move. Therefore, in the above description, when the point A ($x_1$, $y_1$) is located in a center 506 of the template region 501 and the point B ($x_2$, $y_2$) is located in a center 507 of the maximum image height position 505, the motion vector variation due to the distortion, which is expressed by Equation (13), reaches a maximum. This motion vector variation is the maximum variation of the motion vector variation amount caused by the distortion in all of the motion vector measurement regions.

In a step S340 of the flowchart shown in FIG. 3, the motion vector measurement precision is determined on the basis of the maximum motion vector variation due to the distortion, determined in the step S330. A motion vector measurement resolution R, which serves as the motion vector measurement precision, is set to be greater than the maximum motion vector variation determined using Equation (13), or in other words such that a relationship of a following Equation (14) is satisfied. It should be noted that as the resolution R increases, the motion vector measurement precision decreases, and as the resolution R decreases, the motion vector measurement precision increases.

$$\begin{cases} R > \left|\frac{(\alpha_2-1)x_2 -}{(\alpha_1-1)x_1}\right| & \text{Here,} \left|\frac{(\alpha_2-1)x_2 -}{(\alpha_1-1)x_1}\right| > \left|\frac{(\alpha_2-1)y_2 -}{(\alpha_1-1)y_1}\right| \\ R > \left|\frac{(\alpha_2-1)y_2 -}{(\alpha_1-1)y_1}\right| & \text{Here,} \left|\frac{(\alpha_2-1)x_2 -}{(\alpha_1-1)x_1}\right| \leq \left|\frac{(\alpha_2-1)y_2 -}{(\alpha_1-1)y_1}\right| \end{cases} \quad (14)$$

By calculating variation in the motion vector measurement result due to the distortion in the motion vector measurement region at the maximum image height position in order to determine the motion vector measurement resolution (motion vector measurement precision) in this manner, the effects of the distortion can be excluded, and as a result, unevenness in the motion vector can be suppressed. More specifically, by setting the motion vector measurement precision to be lower (by setting the motion vector measurement resolution to be higher) than the maximum motion vector variation due to the distortion, variation in the motion vector due to the distortion is not detected during motion vector measurement. As a result, a highly precise motion vector can be determined without receiving the effects of the distortion.

It should be noted that in the above description, the motion vector calculation precision is calculated using the motion vector measurement region 502 in the maximum image height position of the image (see FIG. 5) as a reference. However, when an image formation region on the image, which is a region in which an image is formed, covers only a part of the image and not the entire image, the motion vector calculation precision may be calculated using the motion vector measurement region in the maximum image height position of the image formation region as a reference.

Figure 7:
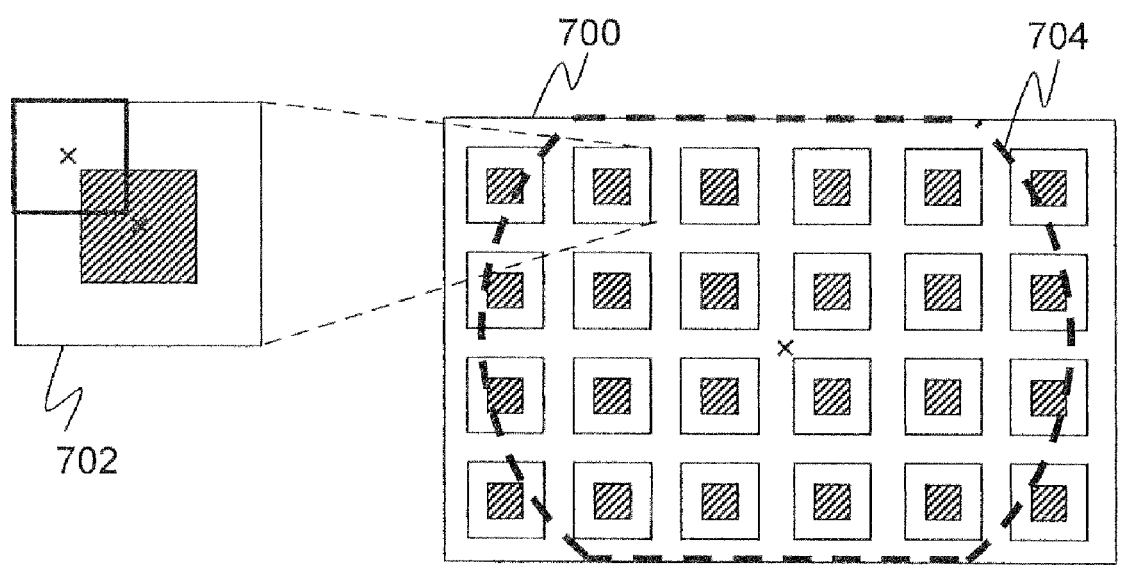
FIG. 7 is a view showing an example in which an image formation region forms a part of the positioning subject image.

FIG. 7 is a view showing an example in which an image formation region 704 forms a part of a positioning subject image 700. In this case, the motion vector measurement region having the maximum image height is selected from the image formation region 704, and therefore a measurement region 702 shown in FIG. 7 is selected. Subsequent processing is identical to that of the above method. In other words, in the selected measurement region 702, the maximum variation of the motion vector variation due to the distortion is determined and then the motion vector measurement precision is determined.

Returning to the flowchart of FIG. 2, the description will be continued. In a step S60, the motion vector calculation unit 114 determines a motion vector for each motion vector measurement region on the basis of the motion vector measurement regions and the motion vector calculation precision determined in the step S50. A method of determining the motion vector will now be described in detail.

First, a motion vector having pixel precision is determined by positioning the template region of the positioning reference image in the measurement region of the positioning subject image. This positioning may be performed using a block matching method for calculating an index match value such as SAD, SSD, or NCC.

Alternatively, block matching may be replaced by an optical flow. It should be noted that the motion vector having pixel precision is determined using all of the set measurement regions as subjects.

Next, a motion vector having sub-pixel precision, i.e. greater precision than pixel precision, is determined in relation to the determined pixel precision motion vectors. For this purpose, first, match index values are re-determined in four pixel positions, namely the closest upper, lower, left and right pixel positions to the pixel position having a match index value that indicates the closest match. When an SSD is determined as the match index value, for example, the pixel position of the match index value indicating the closest match is a pixel position in which the SSD is at a minimum.

Figure 8:
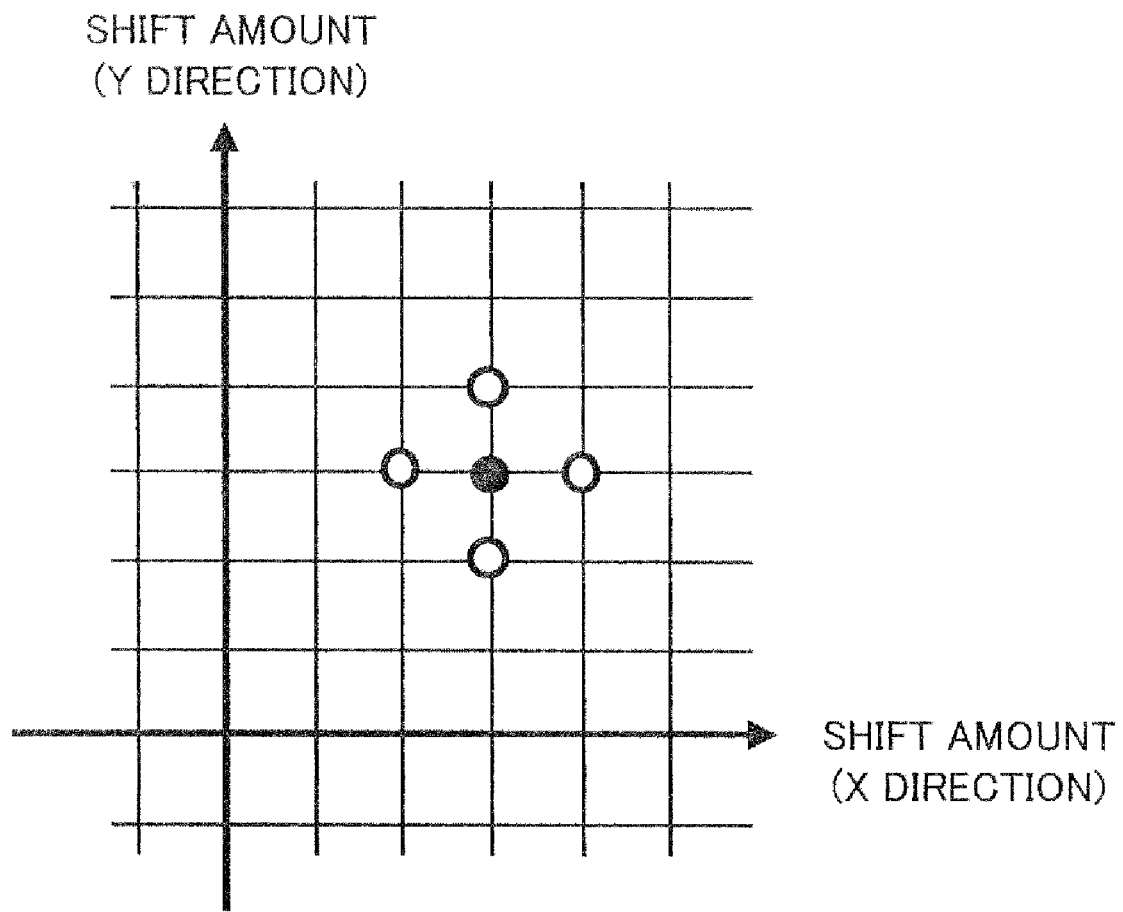
FIG. 8 is a view showing the closest upper, lower, left and right pixel positions to the pixel position having a match index value that indicates the closest match.

FIG. 8 is a view showing the closest upper, lower, left and right pixel positions to the pixel position having the match index value that indicates the closest match. The pixel position having the match index value that indicates the closest match is denoted by a black circle, and the closest upper, lower, left and right pixel positions are indicated by white circles.

Next, the match index values determined in the closest upper, lower, left and right pixel positions are subjected to fitting to determine a peak position of the match index values, whereby the sub-pixel precision motion vector is determined. A well-known method such as equiangular linear fitting or parabola fitting may be used as the fitting method.

Figure 9A:
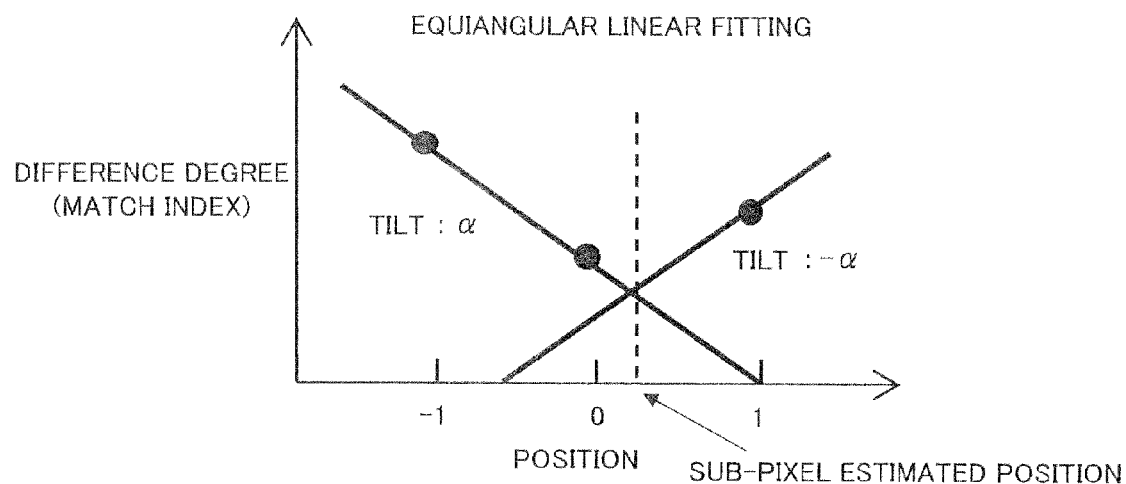
FIG. 9A is a view showing a method of determining a sub-pixel precision motion vector using equiangular linear fitting.

FIG. 9A is a view showing a method of determining the sub-pixel precision motion vector using equiangular linear fitting. For example, when the match index value in the pixel position having a maximum match index value by pixel unit is set as R (0), and the match index values of the pixel positions immediately to the left and right of the pixel position having the maximum match index value are set as R(−1) and R(1), respectively, a sub-pixel precision displacement amount d in the X direction is expressed by the following Equation (15).

$$d = \begin{cases} \dfrac{1}{2} \dfrac{R(1) - R(-1)}{R(0) - R(-1)} & \text{when } R(1) < R(-1) \\ \dfrac{1}{2} \dfrac{R(1) - R(-1)}{R(0) - R(1)} & \text{when } R(1) \geq R(-1) \end{cases} \quad (15)$$

By determining a sub-pixel precision displacement amount in the Y direction in a similar manner using Equation (15) with the match index values of pixel positions immediately above and below set as R(1) and R(−1), respectively, the sub-pixel precision motion vector is determined.

Figure 9B:
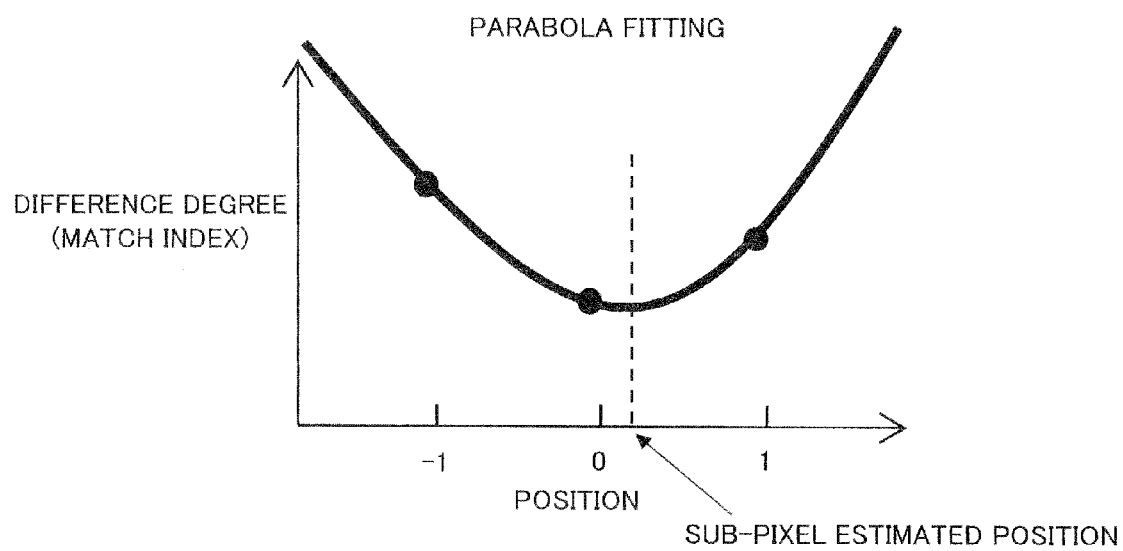
FIG. 9B is a view showing a method of determining the sub-pixel precision motion vector using parabola fitting.

FIG. 9B is a view showing a method of determining the sub-pixel precision motion vector using parabola fitting. In this case, the sub-pixel precision displacement amount d is expressed by the following Equation (16).

$$d = \dfrac{R(-1) - R(1)}{2R(-1) - 4R(0) + 2R(1)} \quad (16)$$

Likewise in this case, by determining sub-pixel precision displacement amounts in the X direction and the Y direction on the basis of Equation (16), the sub-pixel precision motion vector is determined.

The determined sub-pixel precision displacement amount is quantized to the motion vector measurement precision determined in the step S50. For example, when the determined motion vector measurement precision, or in other words a resolution R of the motion vector measurement, is set at 0.1, quantization is performed at the motion vector measurement precision by rounding down digits of the determined sub-pixel precision displacement amount from the second decimal place downward.

When the sub-pixel precision displacement amount has been determined and quantized to the motion vector measurement precision using all of the measurement regions as subjects, the routine advances to a step S70.

In the step S70, the motion vector reliability calculation unit 115 calculates a reliability of each motion vector. The reliability of the motion vector is determined using a deviation between a match index value of a location having the closest match in a histogram of the match index values determined in the motion vector calculation and an average value, for example. When the SSD is used as the match index value, for example, a deviation between a minimum value and an average value of the SSD is used. Simply, the deviation between the minimum value and average value of the SSD is set as the reliability.

A reliability based on the statistical property of the SSD corresponds to the structural features of the region through the following concepts (i) to (iii).

(i) In a region having a sharp edge structure, the reliability of the motion vector is high. As a result, few errors occur in the position exhibiting the minimum value of the SSD. When a histogram of the SSD is created, small difference values are concentrated in the vicinity of the position exhibiting the minimum value. Accordingly, the difference between the minimum value and average value of the SSD is large.

(ii) In the case of a textured or flat structure, the histogram of the difference value has flat properties. As a result, the difference between the minimum value and the average value is small, and therefore the reliability is low.

(iii) In the case of a repeating structure, the positions exhibiting the minimum value and a maximum value of the difference are close, and positions exhibiting a small difference value are dispersed. As a result, the difference between the minimum value and the average value is small, and the reliability is low.

It should be noted that the reliability may be determined in accordance with an edge quantity of each block.

The processing of a step S80 to a step S110 is performed by the motion vector integration processing unit 116. In a step S80, highly reliable motion vectors are selected on the basis of the reliability of each motion vector. For example, highly reliable motion vectors are selected by performing filtering processing to exclude motion vectors having reliability values that are lower than a predetermined threshold.

In a step S90, voting processing is performed on the plurality of motion vectors selected in the selection processing of the step S80 to select the motion vector having the highest frequency, or in other words the single most numerous motion vector. For example, the motion vectors selected in the selection processing are separated into an X direction displacement amount and a Y direction displacement amount, and the most frequent motion vector is determined by performing voting processing in relation to the X direction displacement amount and the Y direction displacement amount, respectively.

Here, when the motion vectors are measured at a resolution which is equal to or lower than the maximum motion vector variation due to the distortion, the motion vector becomes uneven due to the distortion, and as a result, variation occurs in the voting values obtained in the voting processing described above, making it impossible to determine a stable most frequent voting position. When the resolution of the motion vector measurement is too high, on the other hand, the calculation precision of the inter-image positional displacement amount deteriorates. Hence, in this embodiment, the resolution of the motion vector measurement is set at a larger value than the maximum motion vector variation due to the distortion, and as a result, inter-image positioning precision can be secured while determining the most frequent motion vector with a high degree of precision.

In a step S100, a determination regarding the possibility of frame addition is made in relation to the motion vectors remaining after the processing of the steps S80 and S90 by comparing the number thereof (the number of votes for the most frequent positional displacement amount) to a predetermined threshold. When the number of votes is smaller than the predetermined threshold, the routine returns to the step S30 without performing frame addition, whereupon the processing is performed on the next frame. When the number of votes equals or exceeds the threshold, the routine therefore advances to a step S110.

In the step S110, an inter-image representative positional displacement amount is determined. The positioning reference image and the positioning subject image are respectively obtained by reducing the reference image and the subject image. Therefore, the representative positional displacement amount is determined by converting the most frequent motion vector, the number of votes for which equals or exceeds the predetermined threshold, at a magnification ratio used to convert the post-reduction positioning images into the pre-reduction images. The magnification ratio used to convert the post-reduction positioning images into the pre-reduction images is calculated as the inverse of a reduction ratio used when the positioning reference image and the positioning subject image are generated from the reference image and the subject image. For example, when the positioning reference image and the positioning subject image are generated by respectively reducing the reference frame and the subject frame to a quarter of their original size, the representative positional displacement amount is determined by quadrupling the determined most frequent vector.

At this time, the most frequent vector is preferably updated such that the determined representative positional displacement amount exhibits pixel precision. For example, when the most frequent vector is (2.2, 2.6) and the conversion ratio is fourfold, the most frequent vector becomes (8.8, 10.4) if simply quadrupled, and therefore pixel precision is not obtained. By updating the most frequent vector to (2.0, 2.5) before quadrupling it, on the other hand, a pixel precision representative positional displacement amount (8, 10) can be obtained.

In a step S120, the frame addition unit 117 performs frame addition processing on the basis of the reference image and subject image and the inter-image representative positional displacement amount determined in the step S110. More specifically, the subject image is shifted by the representative positional displacement amount and then added to the reference image.

In a step S130, a determination is made as to whether or not the processing has been performed on all of the prescribed frames. When the processing has been performed on all of the prescribed frames, the processing of the flow-chart is terminated, and when an unprocessed frame remains, the routine returns to the step S30, where the processing described above is repeated.

It should be noted that in this embodiment, the optical system data such as the distortion of the optical system are held in the optical system unit 150 itself, and therefore, when a lens is modified in a single lens reflex camera, or the like, for example, suitable image processing conditions for the lens can be set by downloading optical system data relating to the modified lens to the image processing device 100.

The image processing device according to the first embodiment determines a measurement precision for measuring a motion vector between a plurality of images on the basis of information indicating optical system distortion, and sets a plurality of motion vector measurement regions on an image. A motion vector is then determined for each of the plurality of motion vector measurement regions at the determined measurement precision, whereupon a positional displacement amount between the plurality of images is determined on the basis of the determined motion vector. The measurement precision for measuring the motion vector is determined on the basis of the information indicating the distortion in the optical system, and therefore the inter-image positional displacement amount can be determined with a high degree of precision, excluding the effects of the distortion in the optical system.

Further, by determining the measurement precision on the basis of an amount by which the motion vector varies due to the distortion in the optical system, the effects of the distortion in the optical system can be excluded more effectively so that the motion vector can be determined with a high degree of precision. In particular, the measurement precision is determined such that the resolution of the motion vector measurement is higher than a maximum variation amount of the amount by which the motion vector varies due to the distortion in the optical system, and therefore, during motion vector measurement, variation in the motion vector due to the distortion in the optical system can be made negligible. As a result, a highly precise positional displacement amount excluding the effects of the distortion can be determined.

Further, with the image processing device according to the first embodiment, in an image formation region of the image, in which an image is formed, the measurement precision is set such that the resolution of the motion vector measurement is higher than the maximum variation amount of the amount by which the motion vector varies due to the distortion in the optical system. Therefore, data from regions other than the image formation region, in which the motion vector cannot be detected, can be excluded, and as a result, the motion vector can be determined with a high degree of precision while excluding the effects of the distortion in the optical system even more effectively.

Modified Example of First Embodiment

Figure 10:
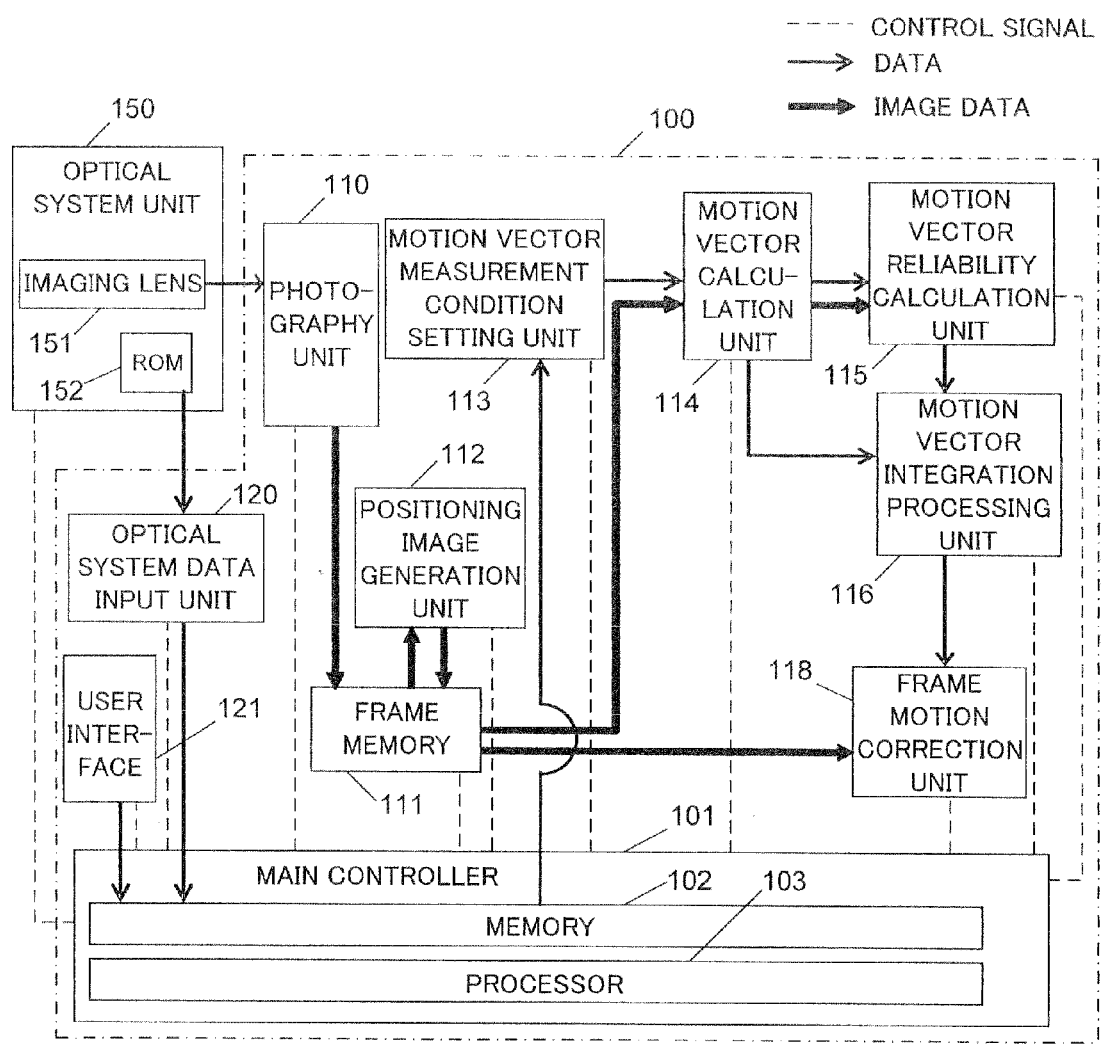
FIG. 10 is a block diagram showing the constitution of an image processing device that performs moving image blur correction.

In the above description, an example of electronic blur correction was cited, but moving image blur correction may be performed by performing image shifting on the subject frame relative to the reference frame. FIG. 10 is a block diagram showing the constitution of an image processing device that performs moving image blur correction. The image processing device shown in FIG. 10 includes a frame motion correction unit 118 instead of the frame addition unit 117 in comparison with the image processing device shown in FIG. 1.

The frame motion correction unit 118 performs processing to correct the subject frame relative to the reference frame so as to reduce blur by shifting the subject frame on the basis of the representative positional displacement amount determined by the motion vector integration processing unit 116.

Second Embodiment

Figure 16A:
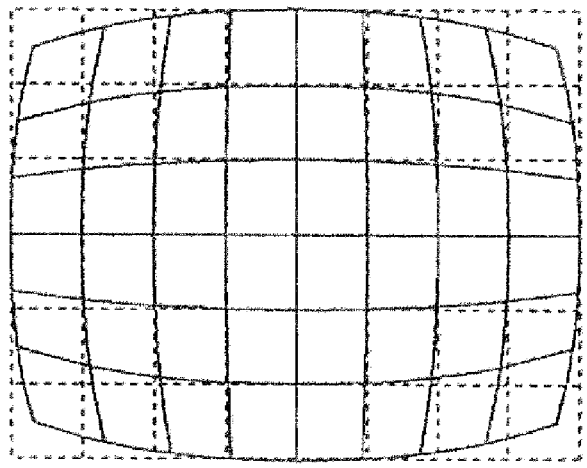
FIG. 16A is a view showing an example of an image photographed using an optical system having negative distortion.
Figure 16B:
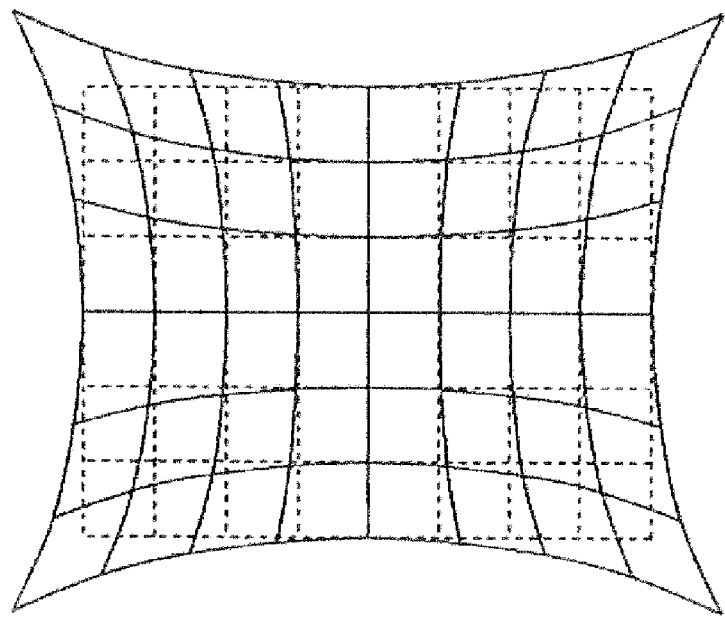
FIG. 16B is a view showing an example of an image photographed using an optical system having positive distortion.

In a second embodiment, the motion vector measurement region is set in each motion vector measurement position while taking into account the effects of distortion. When distortion exists in the optical system, an image that exhibits little distortion in the central portion but is greatly distorted on the end portions is obtained (see FIGS. 16A and 16B). As shown in FIG. 16A, in an image photographed using an optical system having negative distortion, the motion vector of a region having a great image height is smaller than the motion vector of a region having a small image height, even when the size of the motion vector is originally constant. Conversely, as shown in FIG. 16B, in an image photographed using an optical system having positive distortion, the motion vector of a region having a great image height is larger than the motion vector of a region having a small image height. Therefore, by setting the motion vector measurement regions appropriately, taking into account the effects of the distortion, a highly precise positional displacement amount can be determined.

The constitution of the image processing device according to the second embodiment is identical to the constitution of the image processing device according to the first embodiment, shown in FIG. 1.

A processing flow executed by the image processing device according to the second embodiment is identical to the processing flow executed by the image processing device according to the first embodiment, shown in FIG. 2. However, in the image processing device according to the second embodiment, the processing of the step S50, or in other words the processing executed by the motion vector measurement condition setting unit 113, differs from that of the first embodiment.

Figure 11:
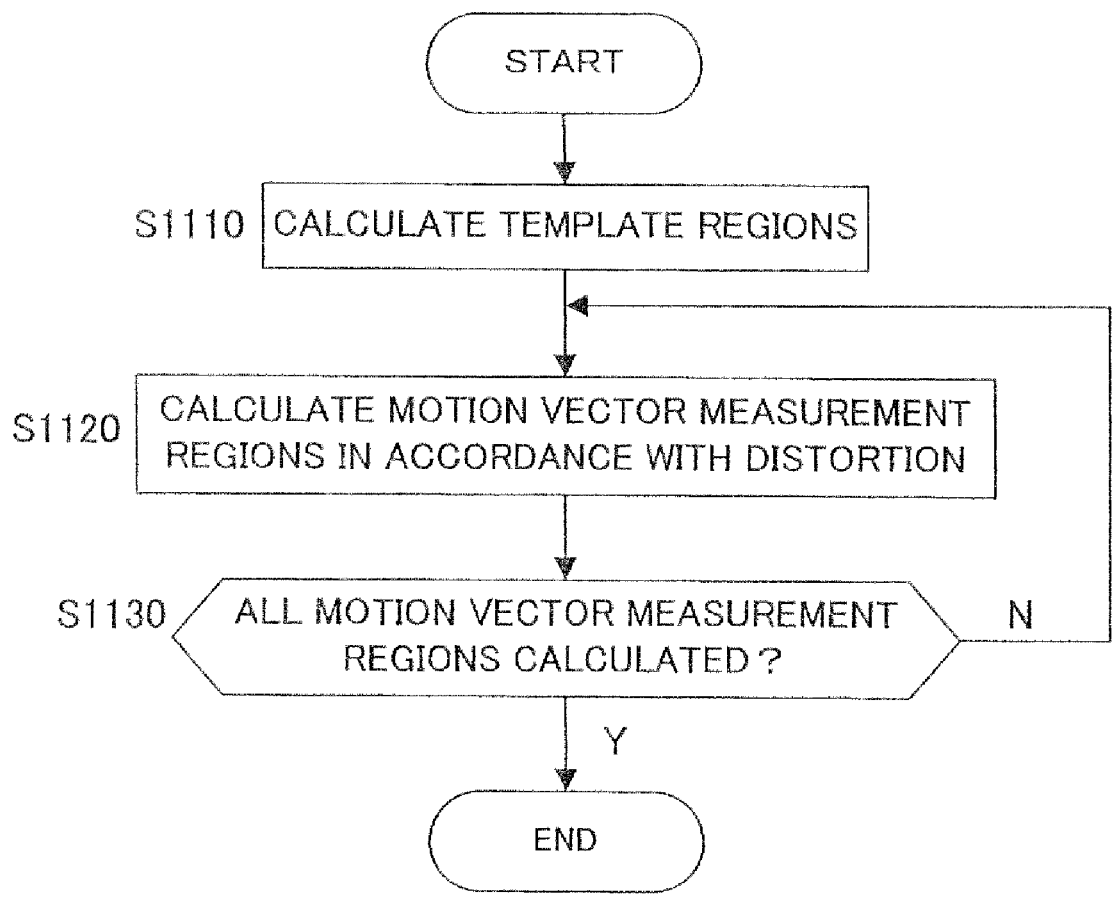
FIG. 11 is a flowchart showing the content of the processing executed by a motion vector measurement condition setting unit in an image processing device according to a second embodiment.

FIG. 11 is a flowchart showing the content of the processing executed by the motion vector measurement condition setting unit 113 in the image processing device according to the second embodiment. In a step S1110, the template regions are set in a grid pattern on the basis of the image information, including the width, height, and so on of the positioning images, and the measurement region parameters such as the number of motion vector measurement regions in the X and Y directions and the search range. The method of setting the template regions is identical to that of the first embodiment.

In a step S1120, a motion vector measurement region, i.e. a motion vector search range, is determined for each of the motion vector measurement positions in accordance with the distortion of the optical system. As described above, a motion vector between two arbitrary points, i.e. a point A ($x_1$, $y_1$) and a point B ($x_2$, $y_2$) on an image photographed under ideal conditions in which no distortion exists is expressed by Equation (10), and a motion vector between two points A'-B' corresponding to the points A-B on an image photographed using an optical system in which distortion exists is expressed by Equation (11).

When a reference motion vector measurement region is set as D, a motion vector measurement region D' corrected in accordance with the distortion is determined from a following Equation (17).

$$D' = C_r \cdot D \quad (17)$$

Here, $C_r$ in Equation (17) is a correction coefficient, which is obtained from a following Equation (18) on the basis of Equations (10) and (11).

$$\begin{cases} C_r = \left| \frac{\alpha_2 x_2 - \alpha_1 x_1}{x_2 - x_1} \right| & \text{when } \left| \frac{\alpha_2 x_2 - \alpha_1 x_1}{x_2 - x_1} \right| > \left| \frac{\alpha_2 y_2 - \alpha_1 y_1}{y_2 - y_1} \right| \\ C_r = \left| \frac{\alpha_2 y_2 - \alpha_1 y_1}{y_2 - y_1} \right| & \text{when } \left| \frac{\alpha_2 x_2 - \alpha_1 x_1}{x_2 - x_1} \right| \leq \left| \frac{\alpha_2 y_2 - \alpha_1 y_1}{y_2 - y_1} \right| \end{cases} \quad (18)$$

Figure 12:
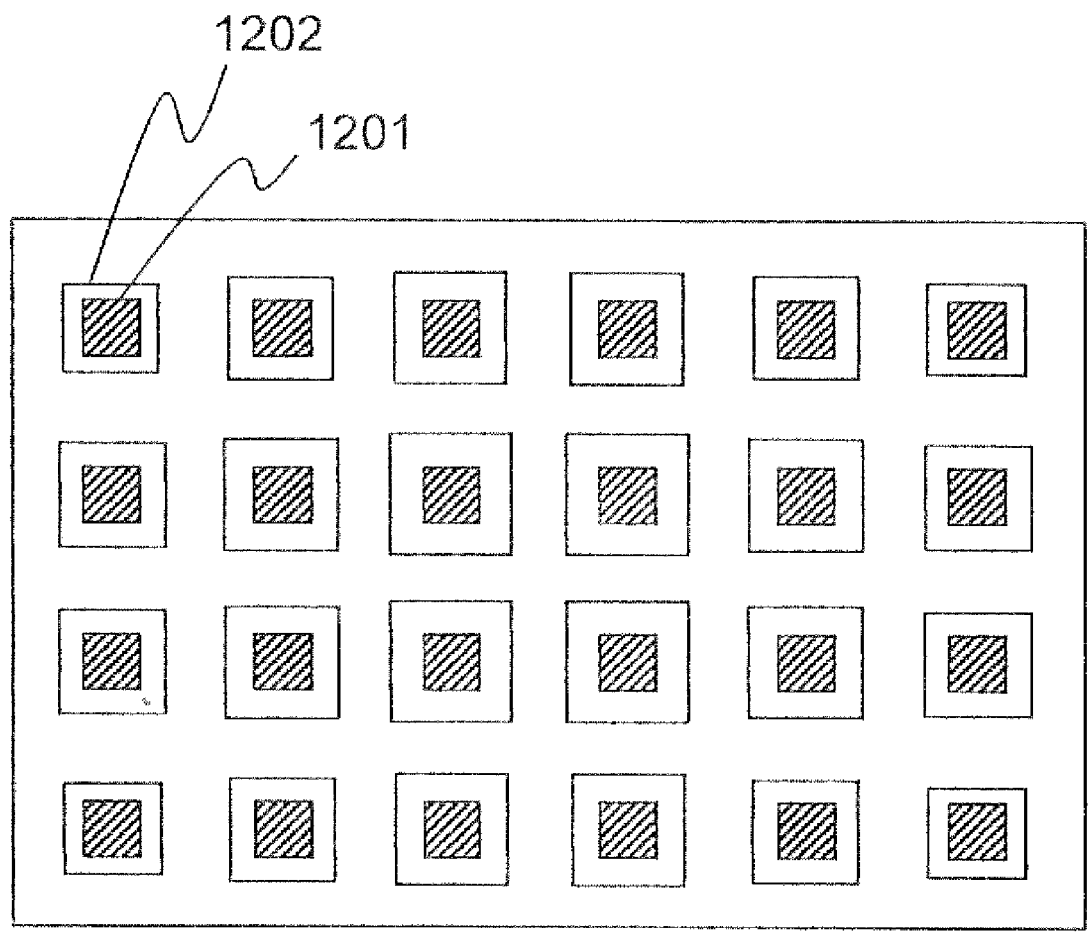
FIG. 12 is a view showing an example of a template region and a motion vector measurement region set by the motion vector measurement condition setting unit 113 when an image is photographed using an optical system having negative distortion.

FIG. 12 is a view showing an example of a template region 1201 and a motion vector measurement region 1202 set by the motion vector measurement condition setting unit 113 when an image is photographed using an optical system having negative distortion (see FIG. 16A). On an image photographed using an optical system having negative distortion, the motion vector of a region having a great image height is smaller than the motion vector of a region having a small image height. Hence, as shown in FIG. 12, the motion vector measurement region of a region having a great image height is set to be smaller than the motion vector measurement region of a region having a small image height. Thus, a situation in which matching processing is performed in a wider measurement region than necessary can be avoided, thereby lightening the calculation load.

On an image photographed using an optical system having positive distortion (see FIG. 16B), the motion vector of a region having a great image height is larger than the motion vector of a region having a small image height. Hence, although not shown in the figure, the motion vector measurement region of a region having a great image height is set to be larger than the motion vector measurement region of a region having a small image height. Thus, a situation in which matching processing is performed in a narrower measurement region than the necessary measurement region, leading to a reduction in the measurement precision of the motion vector, can be avoided.

In a step S1130 of FIG. 11, a determination is made as to whether or not all of the motion vector measurement regions have been determined. When it is determined that all of the motion vector measurement regions have not been determined, the routine returns to the step S1120, in which the size determination processing is performed on another motion vector measurement region. When it is determined that all of the motion vector measurement regions have been determined, on the other hand, the processing of the flowchart is terminated.

With the image processing device according to the second embodiment, the size of the motion vector measurement region is determined in each of the positions for measuring the motion vector between the plurality of images on the basis of information indicating the distortion of the optical system, and a plurality of motion vector measurement regions are set on the image on the basis of the determined sizes. A motion vector is then determined for each of the plurality of motion vector measurement regions, whereupon the positional displacement amount between the plurality of images is determined on the basis of the determined motion vector. As a result, motion vector measurement regions having a size that corresponds to the distortion of the optical system can be set, and therefore the motion vector can be determined with a high degree of precision such that the inter-image positional displacement amount is determined precisely.

Further, a motion vector between two arbitrary points on an image photographed using an optical system in which distortion exists and a motion vector between two points corresponding to the two arbitrary points on an image photographed using an ideal optical system in which distortion does not exist are respectively determined, and the sizes of the motion vector measurement regions are determined on the basis of the determined motion vectors. Thus, motion vector measurement regions of an appropriate size can be set, and therefore the motion vector can be determined with a high degree of precision such that the inter-image positional displacement amount is determined precisely.

Modified Example of Second Embodiment

In the above description, the size of the motion vector measurement region is determined on the basis of the distortion, but the size of the motion vector measurement region may be determined in accordance with a continuous shooting interval (continuous shooting speed) during image pickup. As described above, information relating to the continuous shooting interval (continuous shooting speed) during image pickup is input into the memory 102 from the user interface 121.

Normally, when the continuous shooting interval is short (the continuous shooting speed is high), hand motion or object motion is unlikely to occur and the distance between corresponding points of a plurality of images is short. Therefore, the measurement region is set to be small. When the continuous shooting interval is long (the continuous shooting speed is low), on the other hand, the distance between corresponding points of a plurality of images increases, and therefore the measurement region is set to be large. The measurement region may be set in proportion to the continuous shooting interval so as to increase as the continuous shooting interval increases. Alternatively, a table determining a relationship between the continuous shooting interval and the search range may be provided such that the measurement region is set by referring to this table. In this case, a motion vector measurement region having an appropriate size corresponding to the continuous shooting speed can be set, and therefore the motion vector can be determined with a high degree of precision such that the inter-image positional displacement amount is determined precisely.

Further, the size of the motion vector measurement region may be modified in accordance with the continuous shooting interval during image pickup in relation to the constitution of the image processing device according to the second embodiment. More specifically, the size of the measurement region may be determined in each motion vector measurement position in accordance with the distortion, and the size of the measurement region may be further modified in accordance with the continuous shooting interval.

Third Embodiment

In the image processing device according to the second embodiment, the size of the motion vector measurement region is modified in accordance with the distortion of the optical system. In an image processing device according to a third embodiment, a representative inter-image positional displacement amount is determined after correcting the motion vector measured in each motion vector measurement region in accordance with the distortion of the optical system.

The constitution of the image processing device according to the third embodiment is identical to the constitution of the image processing device according to the first embodiment, shown in FIG. 1.

Figure 13:
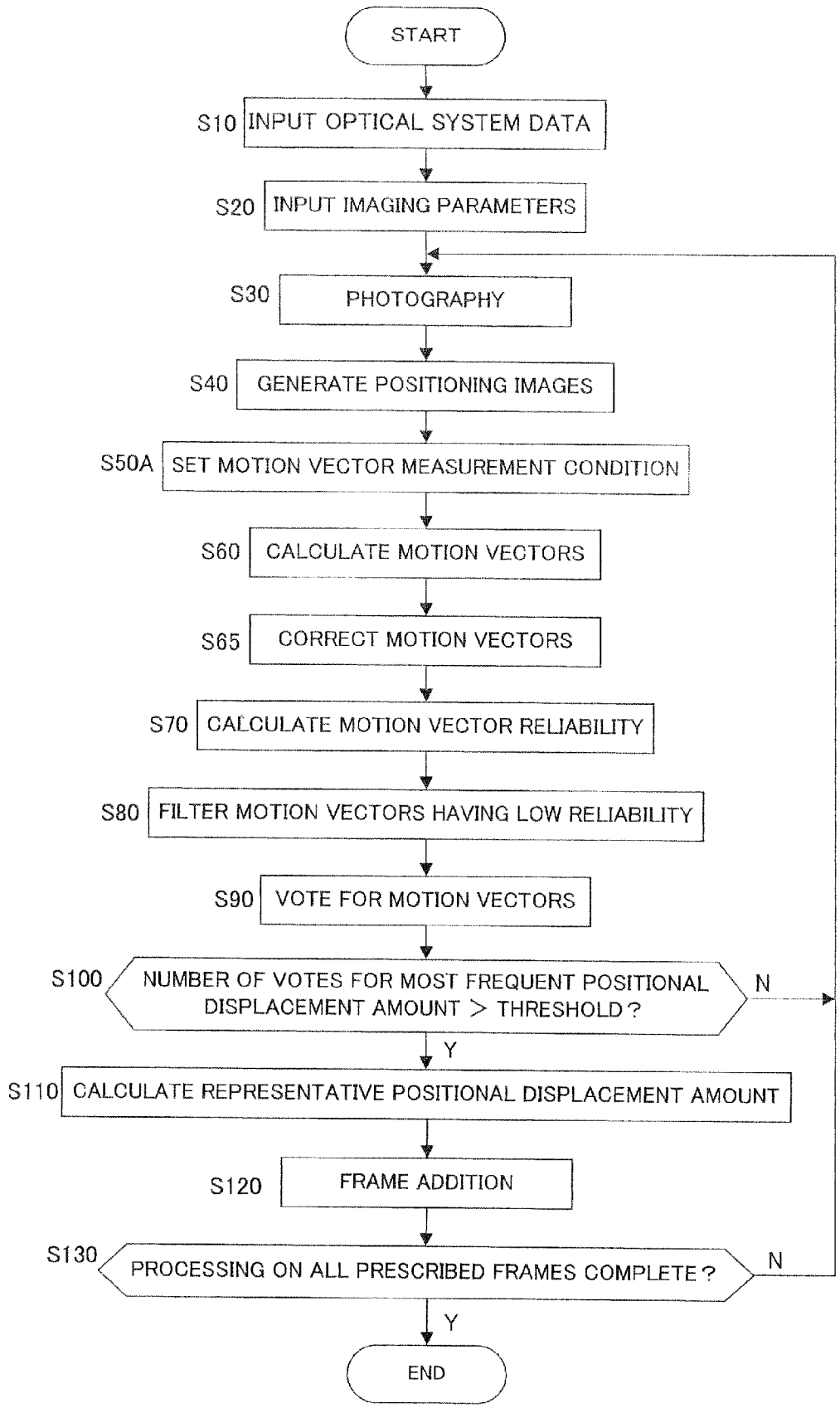
FIG. 13 is a flowchart showing a processing procedure of processing performed by the image processing device according to a third embodiment.

FIG. 13 is a flowchart showing a processing procedure of processing performed by the image processing device according to the third embodiment. This processing differs from the processing of the flowchart shown in FIG. 2 in that the processing of the step S50 is modified to processing of a step S50A, and processing of a step S65 is inserted between the processing of the step S60 and the processing of the step S70.

Figure 14:
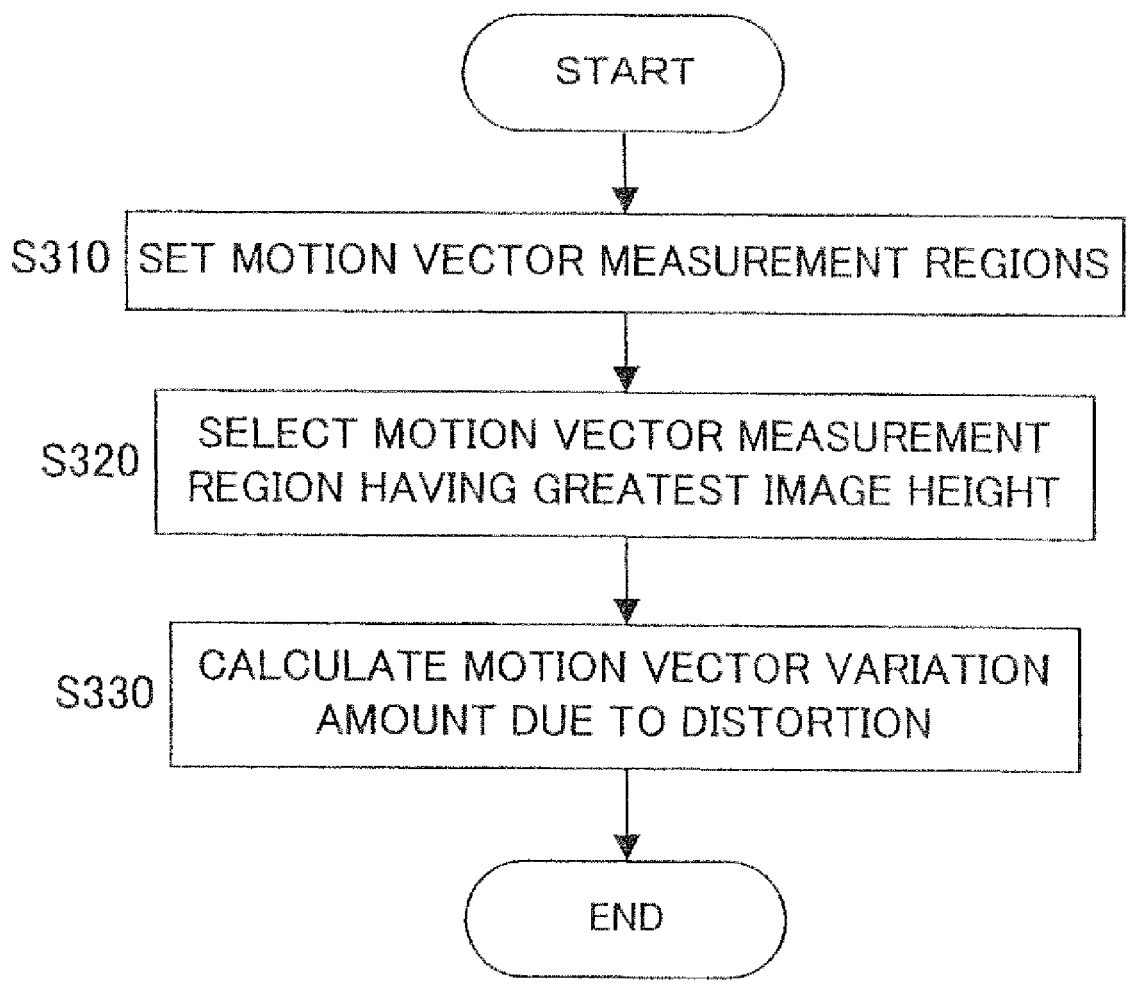
FIG. 14 is a flowchart showing the detail of the processing executed by the motion vector measurement condition setting unit in the image processing device according to a third embodiment.

FIG. 14 is a flowchart showing the processing of the step S50A, or in other words the processing executed by the motion vector measurement condition setting unit 113. The flowchart shown in FIG. 14 is identical to the flowchart shown in FIG. 3 except that the processing of the step S340 has been omitted. In other words, the motion vector measurement condition setting unit 113 performs processing to calculate and set the motion vector measurement region on the basis of the image information including the width, height, and so on of the positioning images and the measurement region parameters such as the number of measurement regions in the X and Y directions and the search range, but does not calculate the motion vector measurement precision.

In the step S65, which follows the processing of the step S60, the motion vector calculation unit 114 determines a corrected motion vector excluding the effects of the distortion in relation to each motion vector. Referring to Equations (10) and (11), a motion vector between points A-B on an image photographed under ideal conditions in which no distortion exists, corresponding to two arbitrary points A' $(x_1, y_1)$ and B' $(x_2, y_2)$ on an image photographed using an optical system in which distortion exists, is expressed by a following Equation (19). Hence, the corrected motion vector is determined from Equation (19).

$$\vec{AB} = \left( \frac{1}{\alpha_2} x_2 - \frac{1}{\alpha_1} x_1, \frac{1}{\alpha_2} y_2 - \frac{1}{\alpha_1} y_1 \right) \quad (19)$$

Figure 15A:
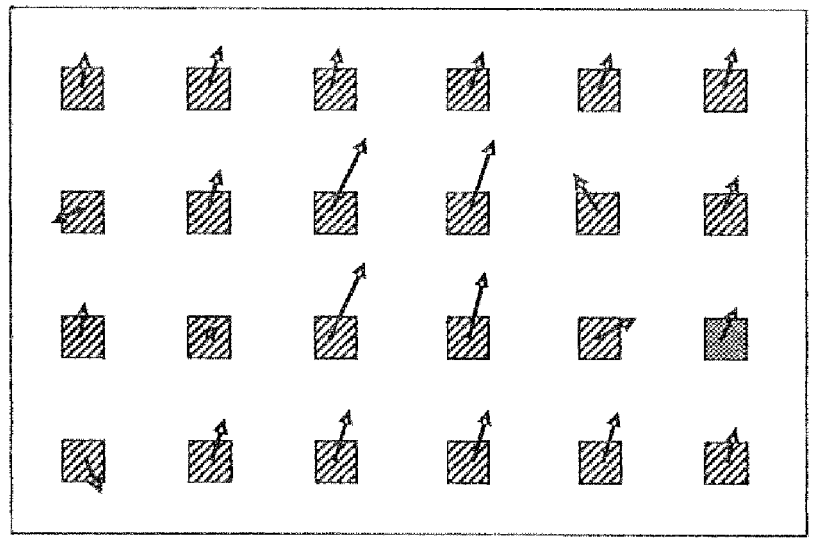
FIG. 15A is a view showing an example of uncorrected motion vectors.
Figure 15B:
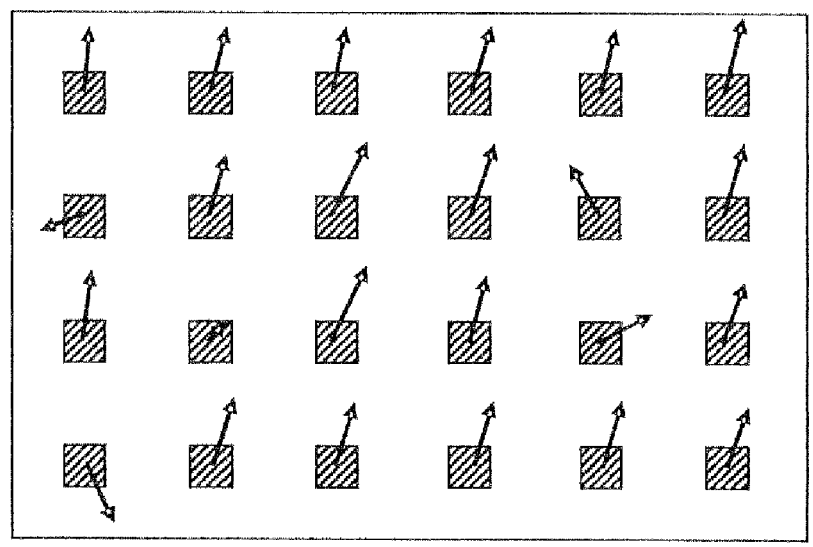
FIG. 15B is a view showing an example of corrected motion vectors excluding the effects of negative distortion.

FIG. 15A is a view showing an example of uncorrected motion vectors, and FIG. 15B is a view showing an example of corrected motion vectors excluding the effects of negative distortion. As shown in FIG. 15B, in the corrected motion vectors excluding the effects of negative distortion, correction is performed such that the motion vectors in regions having a great image height increase in size. The single most numerous motion vector becomes obvious by performing voting processing after determining the corrected motion vectors excluding the effects of distortion, and thus the precision of image positioning can be stabilized.

With the image processing device according to the third embodiment described above, a plurality of motion vector measurement regions are set on an image, whereupon a motion vector is determined for each of the set plurality of motion vector measurement regions. The size of each motion vector is then corrected on the basis of information indicating the distortion of the optical system, whereupon the positional displacement amount between the plurality of images is determined on the basis of the corrected plurality of motion vectors. In particular, correction is performed to convert the respective motion vectors into motion vectors on an image photographed using an ideal optical system in which no distortion exists, and therefore the inter-image positional displacement amount can be determined with a high degree of precision using corrected vectors excluding the effects of distortion in the optical system.

When distortion exists in the optical system and the inter-image positional displacement amount is determined without taking the effects of the distortion into account, double lines or image blurring may occur on the image ends, depending on the magnitude of the inter-image positional displacement amount. FIGS. 17A, 17B and 17C are views respectively showing a reference image, a subject image, and a positioned image in a case where the positional displacement amount is small. In FIGS. 17A to 17C, a corresponding region of the reference image and the subject image is denoted by diagonal lines. In this case, as shown in FIG. 17C, a double line does not occur.

Meanwhile, FIGS. 17D, 17E and 17F are views respectively showing a reference image, a subject image, and a positioned image in a case where the positional displacement amount is large. In FIGS. 17D to 17F also, a corresponding region of the reference image and the subject image is denoted by diagonal lines. In this case, as shown in FIG. 17F, double lines aid image blurring occur at the image ends.

However, with the image processing device according to the first to third embodiments, the inter-image positional displacement amount is determined after excluding the effects of distortion in the optical system, and therefore double lines and image blurring do not occur following positioning.

In the above description of the first to third embodiments, it is assumed that the processing performed by the image processing device is hardware processing, but this invention need not be limited to such a constitution. For example, a constitution in which the processing is performed by software may be employed. In this case, the image processing device includes a CPU, a main storage device such as a RAM, and a computer-readable storage medium storing a program for realizing all or a part of the processing described above. Here, the program is referred to as an image processing program. By having the CPU read the image processing program stored on the storage medium and execute information processing/calculation processing, similar processing to that of the image processing device described above is realized.

Here, a computer-readable storage medium denotes a magnetic disk, a magneto-optical disk, a CD-ROM, a DVD-ROM, a semiconductor memory, and so on. Further, the image processing program may be distributed to a computer by a communication line, whereupon the computer executes the received distributed image processing program.

This invention is not limited to the first to third embodiments described above, and may be subjected to various modifications and applications within a scope that does not depart from the spirit of the invention. For example, the ROM 152 storing the information indicating the distortion of the optical system is assumed to be included in the optical system unit 150, but may be included in the image processing device 100.

In the embodiments described above, the positioning reference image and the positioning subject image are generated by reducing the reference image and the subject image, respectively, and the generated positioning images are used to determine the motion vector. However, the motion vector may be determined using the reference image and subject image, without generating the positioning images.

The inter-image positional displacement amount is determined by selecting highly reliable motion vectors from the plurality of motion vectors determined in the respective motion vector measurement regions and then selecting the most frequent motion vector from the plurality of selected motion vectors. However, the positional displacement amount may be determined by selecting highly reliable motion vectors, and then calculating an average vector of the selected plurality of motion vectors or adding the plurality of selected motion vectors weighted in accordance with the reliability.

This application claims priority based on JP2008-202207, filed with the Japan Patent Office on Aug. 5, 2008, the entire contents of which are incorporated into this specification by reference.

What is claimed is:

1. An image processing device for performing positioning processing on a plurality of images using a positional displacement amount between the plurality of images, the image processing device comprising:
a measurement precision determination unit that determines a measurement precision, which is used when measuring a motion vector between the plurality of images, based on information indicating a distortion in an optical system;
a motion vector measurement region setting unit that sets a plurality of motion vector measurement regions in which the motion vector is to be measured on an image;
a motion vector calculation unit that determines the motion vector between the plurality of images in each of the plurality of motion vector measurement regions at the determined measurement precision; and
a positional displacement amount calculation unit that determines the positional displacement amount between the plurality of images based on the motion vector determined in each of the plurality of motion vector measurement regions.

2. The image processing device as defined in claim 1, wherein the measurement precision determination unit determines the measurement precision based on an amount of variation in the motion vector due to the distortion in the optical system.

3. The image processing device as defined in claim 2, wherein the measurement precision determination unit determines the measurement precision such that a resolution of measurement of the motion vector is greater than a maximum variation amount of the amount of variation in the motion vector due to the distortion in the optical system.

4. The image processing device as defined in claim 2, wherein the measurement precision determination unit determines the measurement precision such that in an image formation region of the image in which an image is formed, a resolution of measurement of the motion vector is greater than a maximum variation amount of the amount of variation in the motion vector due to the distortion in the optical system.

5. The image processing device as defined in claim 1, further comprising an optical system data acquisition unit that obtains the information indicating the distortion in the optical system from an optical system unit including an imaging lens.

6. An electronic image pickup apparatus comprising:
an image pickup device; and
the image processing device as defined in claim 1.

7. An image processing device for performing positioning processing on a plurality of images using a positional displacement amount between the plurality of images, the image processing device comprising:
a motion vector measurement condition setting unit that determines a size of a motion vector measurement region for measuring a motion vector between the plurality of images in each of positions in which the motion vector is to be measured based on information indicating a distortion in an optical system;
a motion vector measurement region setting unit that sets a plurality of the motion vector measurement regions on an image based on the determined size;
a motion vector calculation unit that determines the motion vector between the plurality of images in each of the plurality of motion vector measurement regions; and
a positional displacement amount calculation unit that determines the positional displacement amount between the plurality of images based on the motion vector determined in each of the plurality of motion vector measurement regions.

8. The image processing device as defined in claim 7, wherein the motion vector measurement condition setting unit determines a motion vector between two arbitrary points on an image photographed using the optical system in which the distortion exists and a motion vector between two points corresponding to the two arbitrary points on an image photographed using an ideal optical system in which no distortion exists, and determines the size of the motion vector measurement region based on the determined motion vectors.

9. The image processing device as defined in claim 7, wherein when the optical system has a negative distortion, the motion vector measurement condition setting unit determines the size of the motion vector measurement region such that on an image photographed using the optical system having the negative distortion, the size of a motion vector measurement region having a great image height is smaller than the size of a motion vector measurement region having a small image height that is smaller than the great image height.

10. The image processing device as defined in claim 7, wherein when the optical system has a positive distortion, the motion vector measurement condition setting unit determines the size of the motion vector measurement region such that on an image photographed using the optical system having the positive distortion, the size of a motion vector measurement region having a great image height is larger than the size of a motion vector measurement region having a small image height that is smaller than the great image height.

11. The image processing device as defined in claim 7, further comprising a continuous shooting speed detection unit that detects a continuous shooting speed during image pickup,
wherein the motion vector measurement condition setting unit sets the size of the motion vector measurement region to be larger when the consecutive shooting speed is a low speed than when the continuous shooting speed is a high speed that is higher than the low speed.

12. An image processing device for performing positioning processing on a plurality of images using a positional displacement amount between the plurality of images, the image processing device comprising:
- a motion vector measurement region setting unit that sets a plurality of motion vector measurement regions in which a motion vector between the plurality of images is to be measured on an image;
- a motion vector calculation unit that determines the motion vector between the plurality of images in each of the plurality of motion vector measurement regions;
- a motion vector correction unit that corrects a size of the motion vector determined in each of the plurality of motion vector measurement regions based on information indicating a distortion in an optical system; and
- a positional displacement amount calculation unit that determines the positional displacement amount between the plurality of images based on the plurality of corrected motion vectors.

13. The image processing device as defined in claim 12, wherein the motion vector correction unit performs a correction to convert the motion vector determined in each of the plurality of motion vector measurement regions into a motion vector on an image photographed using an ideal optical system in which no distortion exists.

14. The image processing device as defined in claim 12, further comprising an optical system data acquisition unit that obtains the information indicating the distortion in the optical system from an optical system unit including an imaging lens.

15. An electronic image pickup apparatus comprising:
- an image pickup device; and
- the image processing device as defined in claim 12.

16. A device having stored therein an image processing program that is executable by a computer to perform functions comprising:
- determining a measurement precision, which is used when measuring a motion vector between a plurality of images, based on information indicating a distortion in an optical system;
- setting a plurality of motion vector measurement regions in which the motion vector is to be measured on an image;
- determining the motion vector between the plurality of images in each of the plurality of motion vector measurement regions at the determined measurement precision;
- determining a positional displacement amount between the plurality of images based on the motion vector determined in each of the plurality of motion vector measurement regions; and
- positioning the plurality of images.

17. A device having stored therein an image processing program that is executable by a computer to perform functions comprising:
- determining a size of a motion vector measurement region for measuring a motion vector between a plurality of images in each of positions in which the motion vector is to be measured based on information indicating a distortion in an optical system;
- setting a plurality of the motion vector measurement regions on an image based on the determined size;
- determining the motion vector between the plurality of images in each of the plurality of motion vector measurement regions;
- determining a positional displacement amount between the plurality of images based on the motion vector determined in each of the plurality of motion vector measurement regions; and
- positioning the plurality of images.

18. A device having stored therein an image processing program that is executable by a computer to perform functions comprising:
- setting a plurality of motion vector measurement regions in which a motion vector between a plurality of images is to be measured on an image;
- determining the motion vector between the plurality of images in each of the plurality of motion vector measurement regions;
- correcting a size of the motion vector determined in each of the plurality of motion vector measurement regions based on information indicating a distortion in an optical system;
- determining a positional displacement amount between the plurality of images based on the plurality of corrected motion vectors; and
- positioning the plurality of images.

19. An image processing method comprising:
- determining a measurement precision, which is used when measuring a motion vector between a plurality of images, based on information indicating a distortion in an optical system;
- setting a plurality of motion vector measurement regions in which the motion vector is to be measured on an image;
- determining the motion vector between the plurality of images in each of the plurality of motion vector measurement regions at the determined measurement precision;
- determining a positional displacement amount between the plurality of images based on the motion vector determined in each of the plurality of motion vector measurement regions; and
- positioning the plurality of images.

20. An image processing method comprising:
- determining a size of a motion vector measurement region for measuring a motion vector between a plurality of images in each of positions in which the motion vector is to be measured based on information indicating a distortion in an optical system;
- setting a plurality of the motion vector measurement regions on an image based on the determined size;
- determining the motion vector between the plurality of images in each of the plurality of motion vector measurement regions;
- determining a positional displacement amount between the plurality of images based on the motion vector determined in each of the plurality of motion vector measurement regions; and
- positioning the plurality of images.

21. An image processing method comprising:
- setting a plurality of motion vector measurement regions in which a motion vector between a plurality of images is to be measured on an image;
- determining the motion vector between the plurality of images in each of the plurality of motion vector measurement regions;
- correcting a size of the motion vector determined in each of the plurality of motion vector measurement regions based on information indicating a distortion in an optical system;
- determining a positional displacement amount between the plurality of images based on the plurality of corrected motion vectors; and
- positioning the plurality of images.

* * * * *